(12) United States Patent
Katzenstein

(10) Patent No.: US 10,660,815 B2
(45) Date of Patent: May 26, 2020

(54) CLAMPING CLAW FOR ATTACHING TO A SLIDE RAIL OF AN OPERATING TABLE

(71) Applicant: MAQUET GMBH, Rastatt (DE)

(72) Inventor: Bernhard Katzenstein, Iffezheim (DE)

(73) Assignee: MAQUET GMBH, Rastatt (DE)

( * ) Notice: Subject to any disclaimer, the term of this patent is extended or adjusted under 35 U.S.C. 154(b) by 536 days.

(21) Appl. No.: 15/668,882

(22) Filed: Aug. 4, 2017

(65) Prior Publication Data
US 2017/0326015 A1 Nov. 16, 2017

Related U.S. Application Data

(63) Continuation-in-part of application No. PCT/EP2016/052236, filed on Feb. 3, 2016.

(30) Foreign Application Priority Data

Feb. 9, 2015 (DE) .......................... 10 2015 101 829

(51) Int. Cl.
*A61G 13/10* (2006.01)
*F16B 2/10* (2006.01)
*F16B 2/18* (2006.01)

(52) U.S. Cl.
CPC .............. *A61G 13/101* (2013.01); *F16B 2/10* (2013.01); *F16B 2/185* (2013.01)

(58) Field of Classification Search
CPC .......... A61G 13/101; F16B 2/10; F16B 2/185
See application file for complete search history.

(56) References Cited

U.S. PATENT DOCUMENTS 2,932,873 A * 4/1960 Reichert ................. A61G 13/12
24/498
4,487,330 A * 12/1984 Grover .................... F16B 2/185
220/3.8

(Continued)

FOREIGN PATENT DOCUMENTS

DE        29500046 U1    2/1995
DE    102013108574 A1    3/2015

(Continued)

OTHER PUBLICATIONS

Translation of International Search Report (completed Mar. 4, 2016, dated Mar. 15, 2016) which issued for corresponding international application PCT/EP2016/052236, 2 pages.

*Primary Examiner* — Eric J Kurilla

(74) *Attorney, Agent, or Firm* — Aaron M. Miller

(57) ABSTRACT

A clamping claw is disclosed. The clamping claw includes a base body with a support surface that rests on a slide rail and a clamp assembly. The clamp assembly includes a shaft mounted rotatably about a first rotational axis and a support element pivotably mounted about a second rotational axis. The clamping claw includes an activating member connected to the clamp assembly and configured to place the clamp assembly into a locked state in which the support surface and the support element both rest on the slide rail. The support element is moveable between a starting position and support position via the activating member. When the support element is in the support position, the clamp assembly is in the locked state. The clamping claw includes a locking mechanism to prevent movement of the activating member if the support element is in an intermediate position between the starting and support positions.

20 Claims, 20 Drawing Sheets

(56) References Cited

U.S. PATENT DOCUMENTS

| | | | | |
|---|---|---|---|---|
| 4,487,523 A * | 12/1984 | Monroe | ................... | F16B 2/10 |
| | | | | 24/498 |
| 4,852,841 A * | 8/1989 | Sebring | ............... | A61G 13/101 |
| | | | | 248/231.31 |
| 4,854,016 A * | 8/1989 | Rice | ................... | A61G 13/101 |
| | | | | 24/495 |
| 4,901,964 A * | 2/1990 | McConnell | .......... | A61G 13/101 |
| | | | | 24/514 |
| 5,158,331 A * | 10/1992 | Wesselski | .............. | F16B 2/185 |
| | | | | 294/89 |
| 6,912,959 B2 * | 7/2005 | Kolody | ............... | A61G 13/101 |
| | | | | 108/27 |
| D753,202 S * | 4/2016 | Traver | ......................... | D15/144 |
| 9,488,200 B2 * | 11/2016 | Kamen | .................... | F16B 2/02 |
| 9,951,904 B2 * | 4/2018 | Perez | ................. | F16M 13/022 |
| 10,478,363 B2 * | 11/2019 | Koch | .................. | F16M 13/022 |
| 2009/0013507 A1 | 1/2009 | Scott et al. | | |
| 2015/0247516 A1 * | 9/2015 | Swan | ...................... | F16B 2/185 |
| | | | | 248/27.3 |
| 2017/0224569 A1 * | 8/2017 | Pfeuffer | ............... | A61G 13/101 |
| 2017/0326015 A1 * | 11/2017 | Katzenstein | ......... | A61G 13/101 |

FOREIGN PATENT DOCUMENTS

| | | |
|---|---|---|
| DE | 102014116169 A1 | 5/2016 |
| WO | 2011153081 A2 | 12/2011 |

\* cited by examiner

CLAMPING CLAW FOR ATTACHING TO A SLIDE RAIL OF AN OPERATING TABLE

CROSS REFERENCE TO RELATED APPLICATIONS

The present application is a continuation-in-part filed under 35 U.S.C. § 111(a), and claims the benefit under 35 U.S.C. §§ 365(c) and 371 of PCT International Application No. PCT/EP2016/052236, filed Feb. 3, 2016, which designates the United States of America, and claims benefit of German Patent Application No. 10 2015 101 829.2, filed Feb. 9, 2015. The disclosure of each of these applications is incorporated by reference herein in its entirety.

TECHNICAL FIELD

The present disclosure relates to clamping claws for attachment to a slide rail of an operating table. In particular, the present disclosure relates to clamping claws that are used to secure accessory parts to the slide rails of the operating table.

BACKGROUND

Conventional operating tables may have slide rails along each side of the table. These slide rails are generally rectangular in cross-section and are used for the attachment of accessory parts, such as, for example, support aids, to the operating table in a desired position along the rails. Clamping claws, which are coupled to the accessory parts, are generally used to secure the accessory parts to the slide rails.

In their simplest design, conventional clamping claws, otherwise known as clamping blocks, are generally composed of a bracket-shaped part, which slides onto the slide rail and is then fixed in a desired position via a clamping screw. Conventional clamping claws with more refined designs may allow the claws to be pivoted onto the slide rail at any point along the rail, thereby permitting the claws to be secured to the slide rail more quickly and without having to rely on access to the rail from one of the ends of the slide rail. To secure such a clamping claw to the rail, a support element that can be moved by means of an actuation element is generally provided. Although such clamping claws provide for greater attachment efficiency, they also have various disadvantages. For example, such clamping claws may be attached improperly to a slide rail by being attached to a slide rail with incorrect dimensions or by being operated incorrectly by a user. Furthermore, the user may remain unaware of the claw's improper attachment, which may result in detachment of the accessory part. Additionally, such clamping claws may be embodied as less stable, and even if they are attached properly to the slide rail, they may not be suitable for the attachment of heavy accessories, such as, for example, Goepel leg holders.

For example, an exemplary embodiment of a conventional hook-shaped clamping claw 1 is shown in a side view in FIG. 1. The clamping claw 1 has an actuating lever 2 and a pivot lock 4 that can be pivoted onto a slide rail 3 via the actuating lever 2. When the pivot lock 4 is pivoted properly onto the slide rail 3, a first support surface 5 rests against a lower rail surface 6 of the slide rail 3 and a second support surface 7 of the pivot lock 4 rests against an inner rail surface 8 of the slide rail 3 that faces an operating table (not shown). However, in FIG. 1, an improper attachment of the clamping claw 1 to the slide rail 3 is illustrated, in which the inner rail surface 8 is not contacted by the pivot lock 4. In this defective state, rather than the support surface 5, a surface 9 of the pivot lock 4 that is not designed for resting on the slide rail 3 rests against the lower rail surface 6.

Since the pivot lock 4 is not easily viewed by a user actuating the clamping claw 1, the user generally does not recognize the faulty position of the pivot lock 4, which indicates the faulty attachment of the clamping claw 1 to the slide rail 3. A further complicating factor is that in this faulty state, the actuating lever 2 (actuated by the user for attaching the clamping claw 1 to the slide rail 3) is still arranged in the correct position, which is locked via a pawl and ratchet mechanism 2a. Thus, the user generally never becomes aware of the claw's improper attachment.

The present disclosure provides a stable clamping claw to secure an accessory part to an operating table. The present disclosure further provides a clamping claw, the secure attachment of which to a rectangular slide rail of the operating table, can be easily recognized by a user.

SUMMARY OF THE DISCLOSURE

In accordance with one aspect of the present disclosure, a clamping claw for attaching to a slide rail of an operating table may include a base body comprising a support surface configured to rest on the slide rail and a clamp assembly disposed on the base body. The clamp assembly may include a shaft that is mounted rotatably about a first rotational axis and a first support element pivotably mounted about a second rotational axis that is parallel to the first rotational axis. The clamping claw may also include an activating member that is connected to the clamp assembly. The clamp assembly may be brought by the activating member into a locked state in which the support surface of the base body and the first support element of the clamp assembly both rest on the slide rail. With a pivoting movement of the activating member, the first support element is pivotably moveable between a starting position and a support position. In the support position, the clamp assembly is in the locked state. The clamping claw may further include a locking mechanism configured to prevent a pivoting movement of the activating member if the first support element is in an intermediate position between the starting position and the support position.

In accordance with another aspect of the present disclosure, a clamping claw for attaching to a slide rail of an operating table may include a base body and a clamp assembly disposed on the base body. The clamp assembly may include a shaft that is mounted rotatably about a first rotational axis and a one support element. The shaft may have an eccentric that can be pivoted about the first rotational axis, and the support element may be mounted in a pivotal manner about a second rotational axis, which is stationary relative to the eccentric and which is aligned parallel to the first rotational axis. The clamping claw also may include an activating member that is connected to the clamp assembly, such that during a pivoting movement of the activating member, the support element is pivoted from an unlocked position to a locked position on the slide rail, wherein the clamping structure is in a locked state. The clamping claw may further include a locking mechanism which stops the activating member in an intermediate position between the locked position and the unlocked position when a pivoting movement of the support element is in an intermediate position between its starting position and its support position.

In accordance with yet another aspect of the present disclosure, an operating table system may include an operating table clamp having a base body and an operating table having a rail. The system may also include a clamp assembly disposed on the base body. The clamp assembly may include a shaft that is mounted rotatably about a first rotational axis and a pivot lock pivotably mounted about a second rotational axis that is parallel to the first rotational axis. The system may also include a pivot lever that is connected to the clamp assembly. The clamp assembly may be brought by the pivot lever into a locked state in which the support surface of the base body and the pivot lock of the clamp assembly both rest on the slide rail. With a pivoting movement of the pivot lever, the pivot lock is pivotably moveable between a starting position and a support position. In the support position, the clamp assembly is in the locked state. The system may further include a locking mechanism configured to prevent a pivoting movement of the pivot lever if the pivot lock is in an intermediate position between the starting position and the support position.

In this manner, various embodiments of the present disclosure contemplate that the stopping (i.e., blocking of movement) of the activating member (e.g., pivot lever) may signal to a user, who is pivoting the activating member, that the clamping claw is not securely fastened to the slide rail, thereby largely ruling out incorrect operation of the clamping claw. Furthermore, the simple design of the clamping claws in accordance with the present disclosure, in contrast to more complex conventional clamping claws, makes it possible to use substantially more stable components, so that even heavy accessories can be attached to the clamping claw.

In accordance with one aspect of the present disclosure, if the pivoting movement of the support element is blocked in the intermediate position, i.e., before the support position is reached, the support element cannot be pivoted further into the support position. Movement of the support element, in a different manner (i.e., in which the support element is not pivoted into the support position), however, is not necessarily blocked. With the support element thus blocked from moving into the support position, the pivoting movement of the activating member is also stopped and the activating member is prevented (i.e., blocked) from moving into the locked position. In some exemplary embodiments, the activating member may be allowed to freely pivot in a direction opposite to the direction of the blocked movement. In addition, the activating member may be firmly bonded to the shaft. Alternatively, a crown gear, a spline gear or other polygonal or multi-surface contours that mesh with one another may be formed on the activating member and the shaft. In this case, the activating member and the shaft can be connected via a screw.

In accordance with the present teachings, the support element of the clamp assembly includes a first support surface and a second support surface. When the clamp assembly is in the locked state, the first support surface rests on a first rail surface of the slide rail, facing the operating table, and the second support surface rests on a second rail surface of the slide rail. Such a configuration ensures a secure fastening of the clamping claw to the slide rail when the clamp assembly is in the locked state. In addition, the base body of the clamping claw may rest on the first rail surface of the slide rail and on a third rail surface of the slide rail opposite the second rail surface of the slide rail. In this manner, an unintended release of the clamping claw from the slide rail can be further prevented.

In various exemplary embodiments, the eccentric is cylindrical, and the longitudinal axis of the eccentric forms the second rotational axis. In this manner, a simpler and more stable design of the clamping claw is achieved.

In various additional embodiments, the locking mechanism may have a stop and a stop surface. In this manner, when the pivoting movement of the support element is blocked, the support element strikes against the stop surface in such a way that a pivoting movement of the eccentric caused by the pivoting movement of the actuation element is also blocked. Further pivoting movement of the actuation element is therefore blocked simply and securely by the eccentric, which is non-rotatably connected to the activating member via the shaft.

The stop may be formed, for example, on the support element and the stop may be fixedly connected to the base body. Such a configuration ensures that the stop will strike against the stop surface only when the pivoting movement of the support element is blocked. In various additional embodiments, when the pivoting movement of the support element is blocked, it is possible for the support element to execute a compensating movement caused by the pivoting movement of the eccentric. For example, the stop striking the stop surface may cause the compensating movement of the support element to be restricted or prevented in such a way that the pivoting movement of the eccentric is blocked.

In various exemplary embodiments, the stop is a pin and the stop surface is formed in a groove, for example, in the first support element. This configuration further ensures the simple and stable design of the locking mechanism. In various additional exemplary embodiments, the stop surface of the groove and the pin are aligned parallel to the second rotational axis. This configuration enables the pivoting movement of the support element, whereas a movement that displaces the support element is simply prevented. In various further exemplary embodiments, the width of the groove is greater than the diameter of the pin. This configuration enables a secure bearing of the support surfaces of the support element on the slide rail, irrespective of their specific dimensions. Since the groove is wider than the diameter of the pin, the support element has freedom to move, which ensures that all support surfaces of the support element rest securely on the slide rail.

The disclosed assembly may comprise a second support element which is mounted on the shaft in a pivotal manner about the first rotational axis and has at least one support surface which rests against the slide rail when the clamping structure is in the locked state. This configuration increases the strength with which the clamping claw rests against the slide rail. For example, due to the pivotable mounting of the second support element, the support surfaces can be aligned precisely on the slide rail when the clamping claw is placed on the slide rail.

In accordance with various further exemplary embodiments, the eccentric may have a first eccentric portion and a second eccentric portion. In addition, the support element has a first arm and a second arm, the first arm being mounted rotatably on the first eccentric portion and the second arm being mounted rotatably on the second eccentric portion, each eccentric portion being rotatable about the second rotational axis. Furthermore, the second support element is disposed between the arms of the support element. As a result, the clamping claw is particularly stable against external torque exerted by the accessory on the clamping claw. For example, heavy accessories attached to the clamping claw can be secured on a lever arm which is aligned parallel to the first rotational axis of the clamping claw. The torque that is thereby exerted on the clamping claw can be transmitted to the slide rail in a particularly effective and material-friendly manner by the arm of the support element, which faces away from the accessory, since this arm is subjected to a relatively small force.

In accordance with one aspect of the disclosure, the shaft may include a first shaft element, a second shaft element, and a connection element. The first eccentric portion may be formed on the first shaft element and the second eccentric portion may be formed on the second shaft element. The connecting element may have a through-hole into which the first and second shaft elements may protrude (i.e., on opposite sides of the connecting element). The first shaft element can be connected rotationally to the second shaft element about the first rotational axis. Furthermore, the connecting element may be mounted on the base body in a rotatable manner about the first rotational axis, and the second support element may be pivotably mounted on the connecting element about the first rotational axis. This configuration allows the clamping claw to be easily mounted to the slide rail, without unnecessarily decreasing the stability of the clamping claw. For example, for assembly, first the connecting element, the second support element, and the pivot lock are arranged in the clamping claw, and then the two shaft elements are guided from opposite sides through the arms of the pivot lock and the through-hole of the connecting element.

In various additional exemplary embodiments, the first arm and/or the second arm may have a projection, in which case a helical compression spring and/or an arm spring is arranged between the projection and the base body and presses a surface of the groove, which is opposite the support surface of the groove, against the pin. This configuration provides a reliable guidance of the support element during pivoting onto the slide rail.

In various further exemplary embodiments, the at least one support surface of the second support element may be disposed on a first side of the second support element, the first side being configured to rest on the slide rail. The at least one support surface may include a first contact surface and a second contact surface opposite the first contact surface. This configuration increases the stability of the clamping claw placed on the slide rail in the locked state. Furthermore, such a support element may be useful for slide rails having a hollow profile, since such a profile generally only has sufficient pressure stability in areas along the edges of the slide rail. Such an arrangement of the support surfaces is also useful, for example, when the slide rail is screwed to the operating table and the clamping claw is to be mounted in the area of a fastening screw, because the support surfaces do not rest on a center area of the slide rail surface where the fastening screw, which is generally recessed, is located.

In some exemplary embodiments, the second support element may include a second side having third and fourth contact surfaces. In such embodiments, the second support element may be removable from the base body such that the second support element can be reinserted into the base body. In this configuration, when the clamp assembly is in the locked state, the third and fourth contact surfaces rest on the slide rail. The clamping claw can thereby be adapted for use with slide rails of different dimensions by inserting the additional support element into the base body such that the side of the additional support element that is most suitable for the corresponding slide rail rests on the slide rail in the locked state.

In other exemplary embodiments, the activating member may be a pivot lever having a ratchet shoe with at least one rachet pawl, which in the locked state engages in a releasable manner with a toothing disposed on the base body. Such ratchet pawls, which are engaged with the toothing in the locked position of the activating member, enable a user to easily distinguish the locked position from the intermediate position of the activating element. In addition, the clamping claw can be securely mounted on the slide rail.

Additional objects and advantages will be set forth in part in the description which follows, and in part will be obvious from the description, or may be learned by practice of the present disclosure. The objects and advantages may be realized and attained by means of the elements and combinations particularly pointed out in the appended claims and their equivalents.

It is to be understood that both the foregoing general description and the following detailed description are exemplary and explanatory only and are not restrictive of the present disclosure and claims.

BRIEF DESCRIPTION OF THE DRAWINGS

Additional features and advantages of the present disclosure will be apparent from the following description, in which the present disclosure is explained in reference to exemplary embodiments, in conjunction with the accompanying figures. The drawings show.

DETAILED DESCRIPTION

Figure 1:
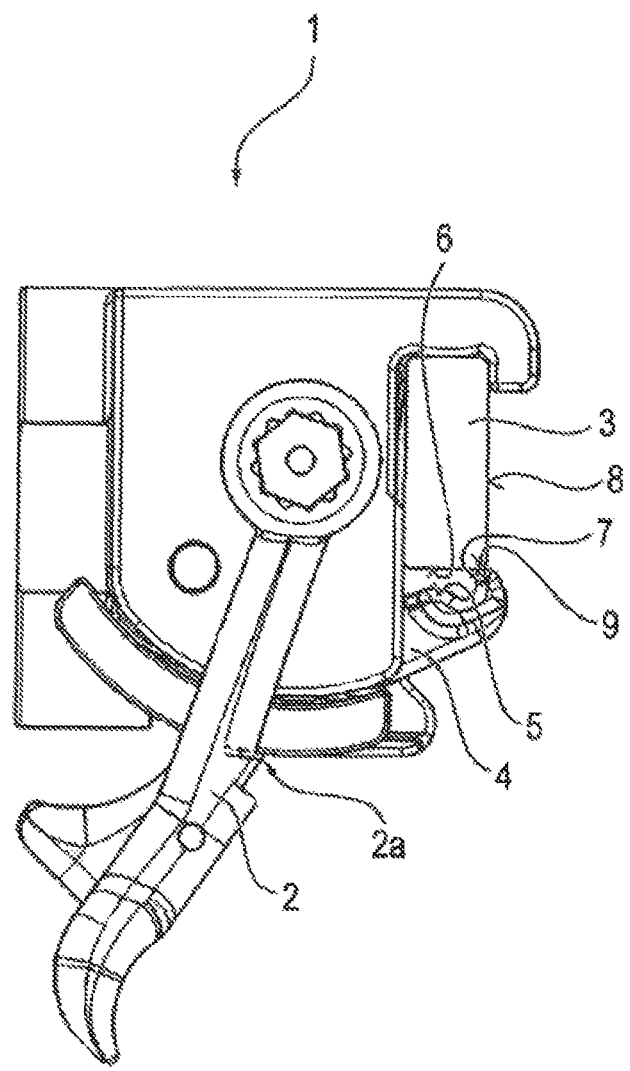
FIG. 1 is a side view of a conventional clamping claw, which is incorrectly mounted on a slide rail.
Figure 2:
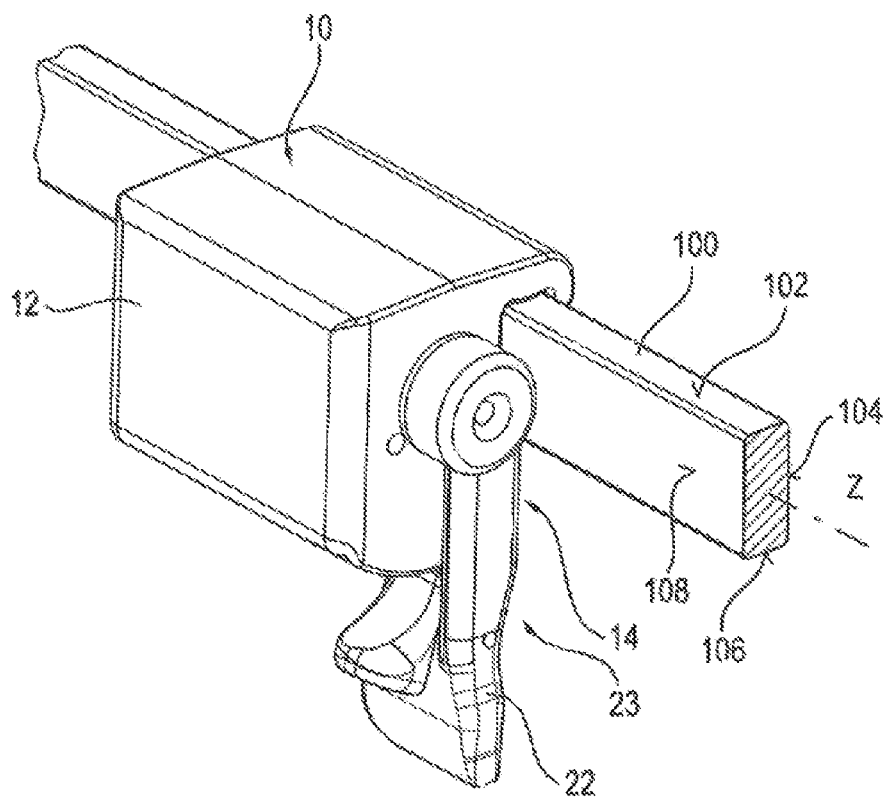
FIG. 2 is a perspective view of an exemplary clamping claw in accordance with the present disclosure, mounted on a slide rail.
Figure 3:
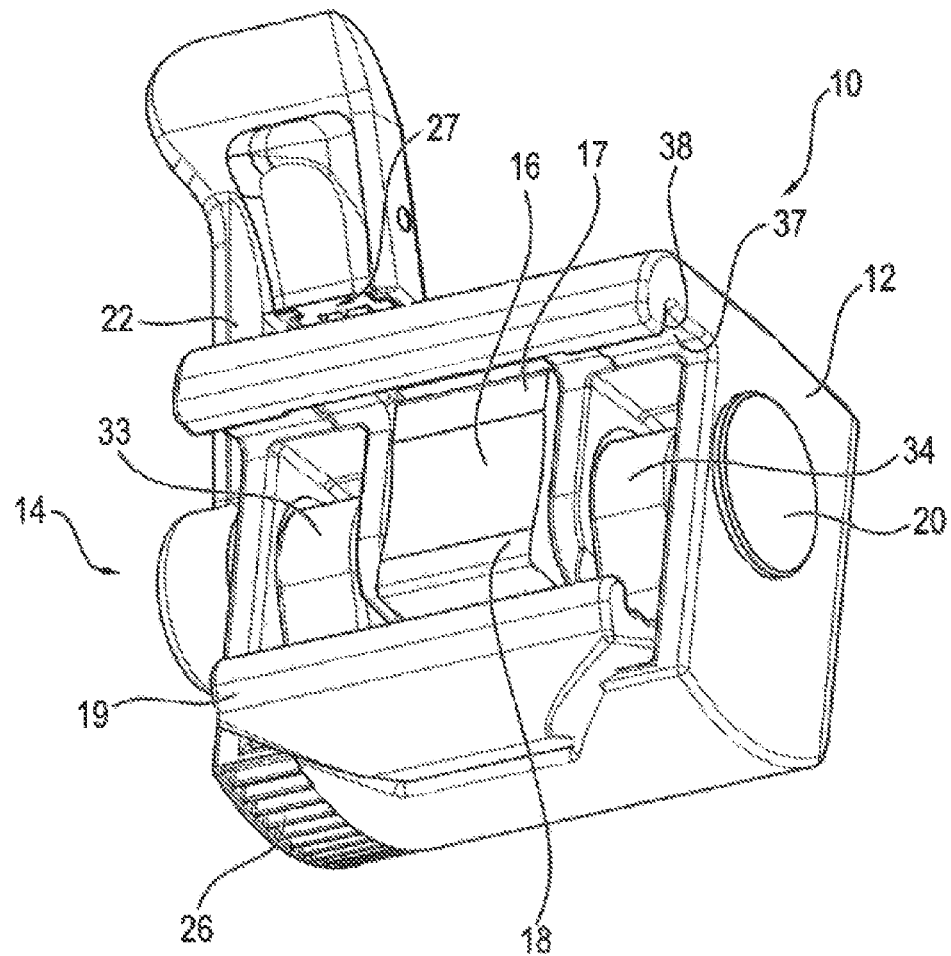
FIG. 3 is a front perspective view of the clamping claw of FIG. 2.

FIGS. 2 and 3 each show a perspective view of a clamping claw 10 in accordance with an exemplary embodiment of the present disclosure. In FIG. 2, the clamping claw 10 is shown mounted on a slide rail 100 and, in FIG. 3, the clamping claw is shown without the slide rail 100. As shown in FIG. 2, the slide rail 100 has a rectangular cross-section and is surrounded by the clamping claw 10 transversely to a longitudinal axis Z of slide rail 100. The slide rail 100 is contacted by the clamping claw 10 on an upper rail surface 102, an inner rail surface 104 that faces an operating table (not shown), a lower rail surface 106, and an outer rail surface 108. As described further below, the clamping claw 10 is configured to be mounted securely on the slide rail 100.

As illustrated in FIGS. 2 and 3, the clamping claw 10 has a base body 12 and a clamp assembly 14. The base body 12, shown in FIG. 3, is substantially hook-shaped and has a first support surface 37 and a second support surface 38 which, when the clamping claw 10 is mounted on the slide rail 100, are arranged on the upper rail surface 102 and on the inner rail surface 104, respectively, of the slide rail 100.

Figure 4:
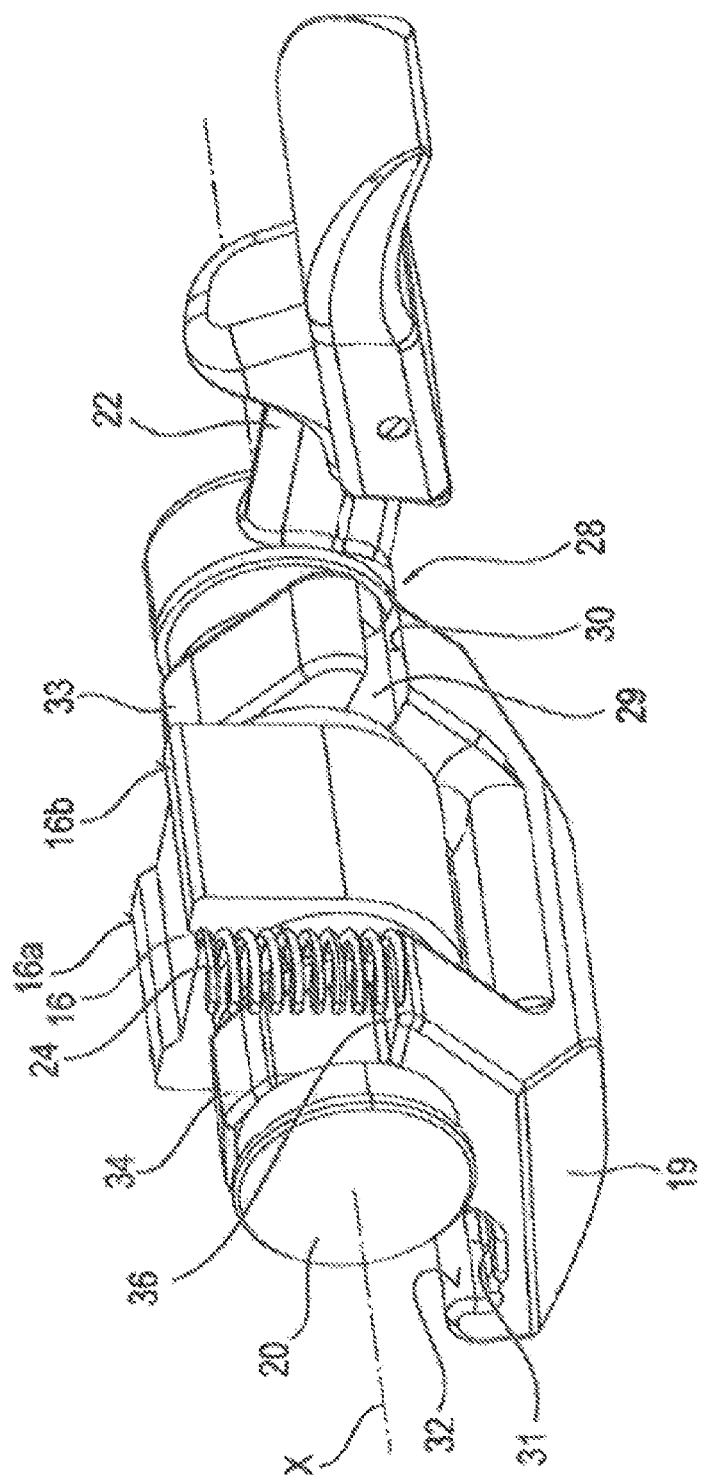
FIG. 4 is a front perspective view of an exemplary clamp assembly of the clamping claw of FIG. 2.

The clamp assembly 14 of the clamping claw 10, best shown perhaps in FIG. 4, in which the base body is removed for clarity, comprises a pivot lock 19 which forms a first support element for resting on the slide rail 100, a pressure piece 16 which forms a second support element for resting on the slide rail 100, an eccentric shaft 20 which is rotatable about a rotational axis X, an activating member 22 (shown in the drawings as a pivot lever), a helical compression spring 24, a pawl and ratchet mechanism (see FIG. 3), which comprises a toothing 26 formed on the base body 12 and a locking device 27, and a locking mechanism 28. In various exemplary embodiments, the locking mechanism 28 includes a stop fixedly connected to the base body 12 and a stop surface formed in the first support element (i.e., the pivot lock 19) of the clamp assembly 14. For example, as explained further below, the stop surface may include a groove 29 formed in the pivot lock 19 with a first stop surface 30 and the stop may include a pin 82. The pivot lock 19 has a first support surface 31 and a second support surface 32, which rest on the slide rail 100 when the clamp assembly 14 is in a locked state, as shown in FIG. 2. Furthermore, when the clamp assembly 14 is in the locked state, two support surfaces 17, 18 of the pressure piece 16, shown in FIG. 3, rest on the slide rail 100. As will be described further below, when the clamp assembly 14 is in the locked state, the activating member 22 is in a locked position 23 (see, e.g., FIG. 15).

As shown in FIG. 4, the pivot lock 19 has a first arm 33, in which a groove 29 is formed, and a second arm 34, with a projection 36, which is connected in a resilient manner to the base body 12 via the helical compression spring 24. The pressure piece 16, which is arranged between the arms 33, 34, has a first contact surface 16a and a second contact surface 16b, which are arranged at a distance from an upper side of the base body 12 in FIG. 3.

Figure 5:
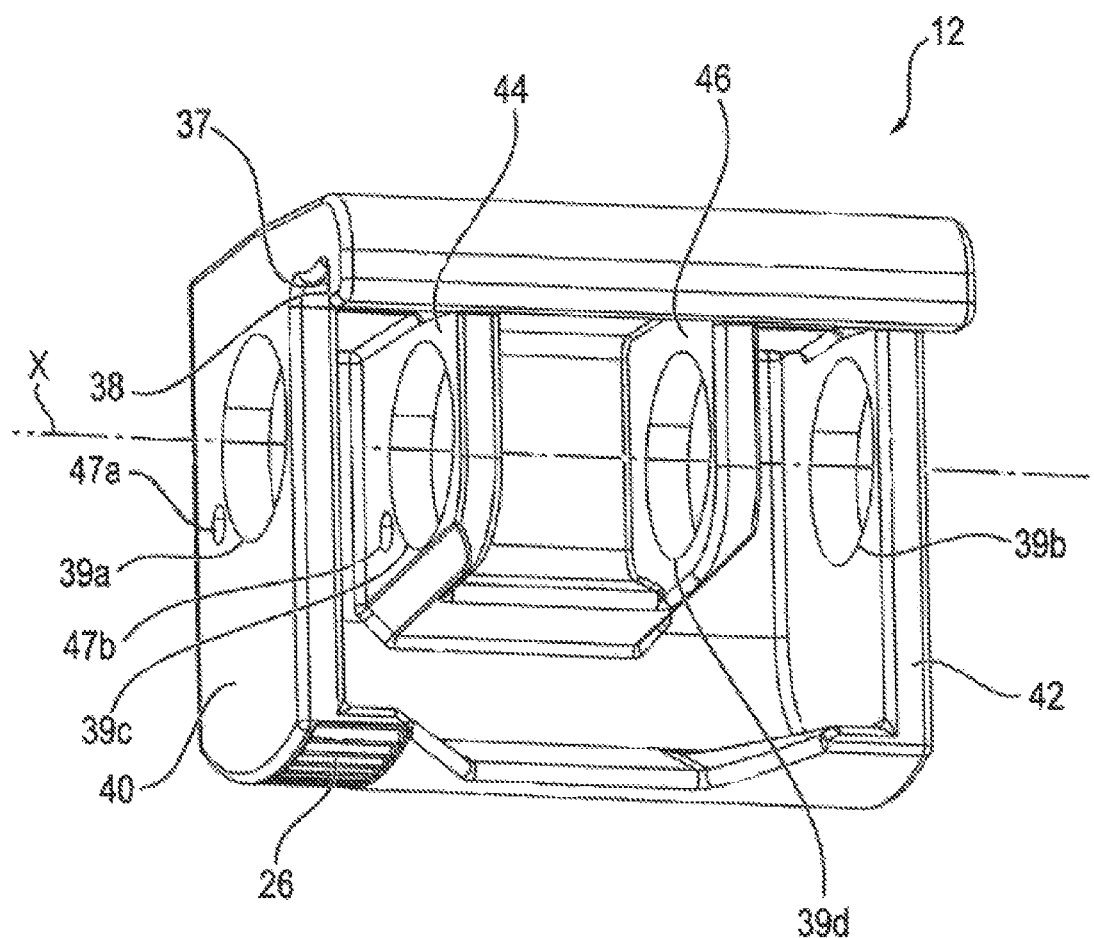
FIG. 5 is a front perspective view of an exemplary base body of the clamping claw of FIG. 2.

For clarity purposes, the perspective view of FIG. 5 shows the base body 12 by itself. The base body 12 has four openings, formed coaxially around the rotational axis X, of which a first opening 39a is formed in a first side wall 40 of the base body 12, a second opening 39b is formed in a second side wall 42 of the base body 12 opposite the first side wall 40, a third opening 39c is formed in a first support wall 44 arranged between the first side wall 40 and the second side wall 42, and a fourth opening 39d is formed in a second support wall 46 arranged between the first support wall 44 and the second side wall 42. In addition, the first support wall 44 and the first side wall 40 each have a support surface 47a and 47b, respectively, which are formed coaxially to an axis that is parallel to the rotational axis X. In this manner, a pin 82 (See, e.g., FIG. 15), of the locking mechanism 28 may be guided through the through-holes 47a and 47b to be fixedly connected to the base body 12.

Figure 6:
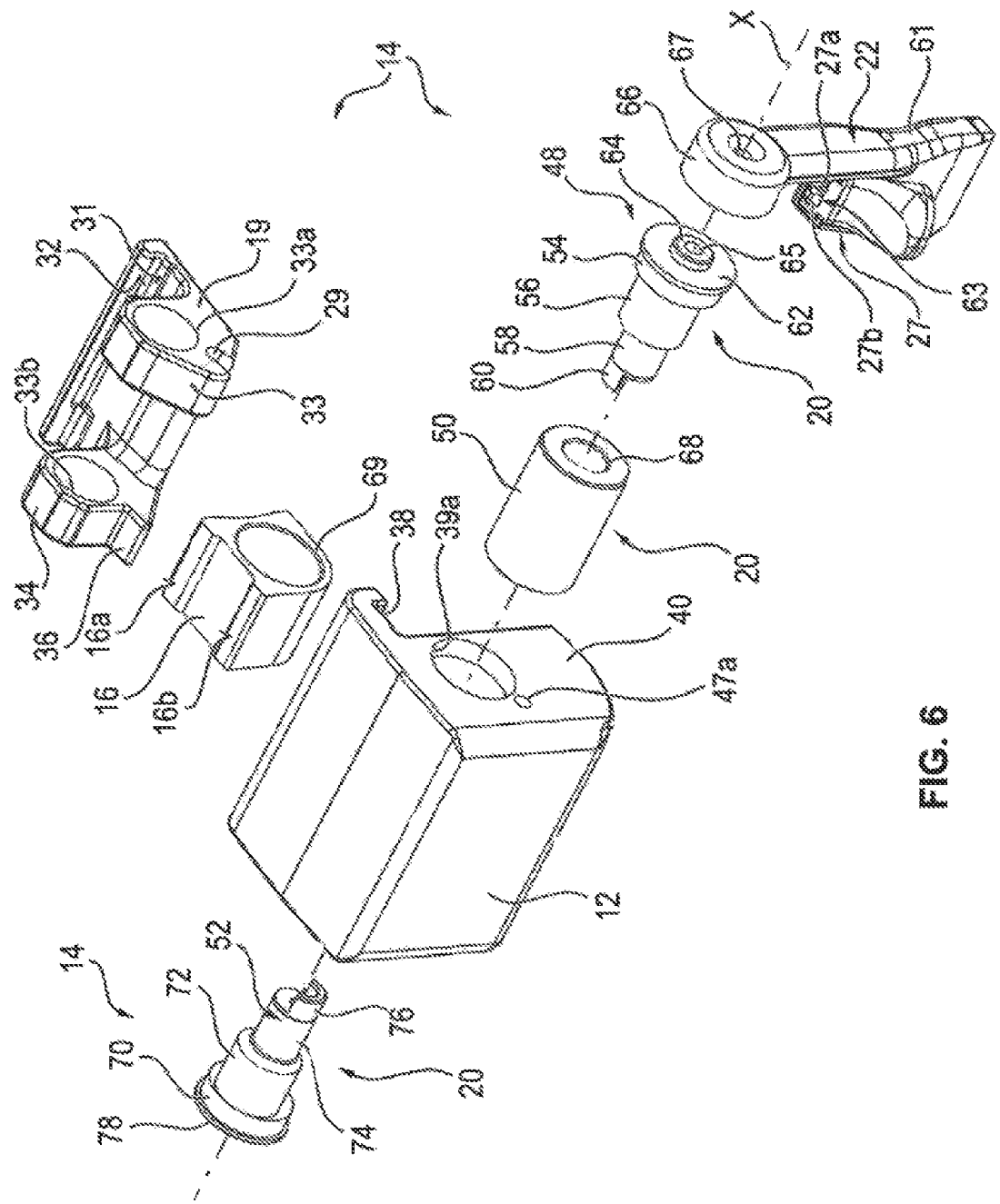
FIG. 6 is an exploded view of the base body and the clamp assembly of the clamping claw of FIG. 2.
Figure 7:
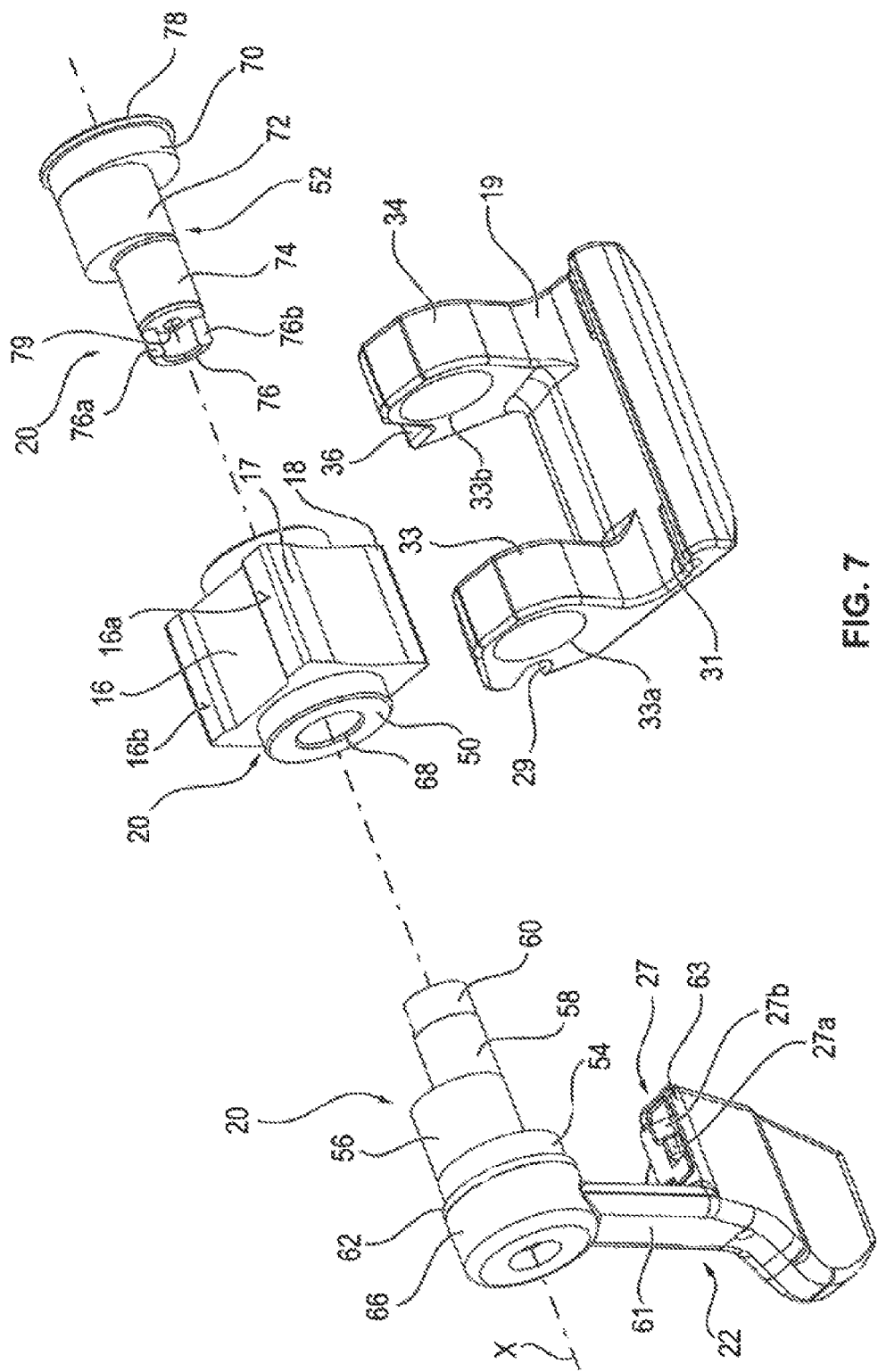
FIG. 7 is a partially exploded view of the clamp assembly of FIG. 4.

The arrangement of the clamp assembly 14 and the base body 12, shown in FIG. 3, will be explained in greater detail below with reference to FIGS. 6-9. FIG. 6, for example, shows an exploded view of the base body 12 and elements of the clamp assembly 14, which are shown in FIG. 7 in a further exploded view, in which the base body is removed for clarity. As illustrated in FIG. 6, the arms 33 and 34 of the pivot lock 19 each have an opening formed coaxially, the opening of the first arm 33 being designated as 33a and the opening of the second arm 34 being designated as 33b.

Additionally, the eccentric shaft 20 of the clamp assembly 14, shown in individual parts in FIG. 6, comprises a first shaft element 48, a connecting element 50, and a second shaft element 52, each arranged rotatably about the rotational axis X. The first shaft element 48 has a first shaft section 54, an eccentric 56 arranged eccentrically to the first rotational axis X, a second shaft section 58, a shaft-connecting element 60, a stop disc 62 and a bearing pin 64. In various exemplary embodiments, the shaft-connecting element 60 has a semi-cylindrical shape. The shaft sections 54, 58, the stop disk 62, and the bearing pin 64 are each arranged coaxially about the rotational axis X and are formed cylindrically.

As above, in various exemplary embodiments, the activating member 22 may comprise a pivot lever. For example, the pivot lever 22 is shown in FIG. 6 separately from the stop disk 62 and the bearing pin 64, and has a connecting head 66 and a lever arm 61, to which the locking device 27 is attached. The locking device 27 comprises a ratchet shoe 63 with two pawls 27a and 27b, which can be brought into engagement with the toothing 26 of the base body 12, so that the activating member 22 is engaged on the base body 12. The connecting head 66 of the pivot lever 22 is integrally connected to the stop disk 62 and the bearing pin 64, as is shown in FIG. 7, so that the pivot lever 22 is coupled rotationally to the first shaft element 48. Further, the connecting head 66 and the first shaft element 48 each have a through-bore formed along the first rotational axis X, with the through-bore of the first shaft element 48 being designated in FIG. 6 as 65 and the through-bore of the connecting head 66 being designated as 67.

The connecting element 50, positioned next to the first shaft element 48 in FIG. 6, is cylindrical; connecting element 50 has a through-hole 68 arranged concentrically thereto, and is guided through a through-hole 69 formed in the pressure piece 16, as shown in FIG. 7. The pressure piece 16 is mounted on the connecting element 50 in a rotatable manner about the rotational axis X. The second shaft element 52 has a first shaft section 70, an eccentric 72 formed eccentrically to the rotational axis X, a second shaft section 74, a shaft-connecting element 76, and a stop disk 78, of which the stop disk 78 and the shaft sections 70 and 74 are each arranged coaxially about the rotational axis X. The shaft-connecting element 76, which adjoins the shaft section 74 of the second shaft element 52, is semi-cylindrical in shape, and has two support surfaces, a first support surface being marked in FIG. 7 as 76a and a second support surface being designated as 76b. The second shaft element 52 further has a blind borehole 79, which is formed along the first rotational axis X, with an internal thread.

Figure 8:
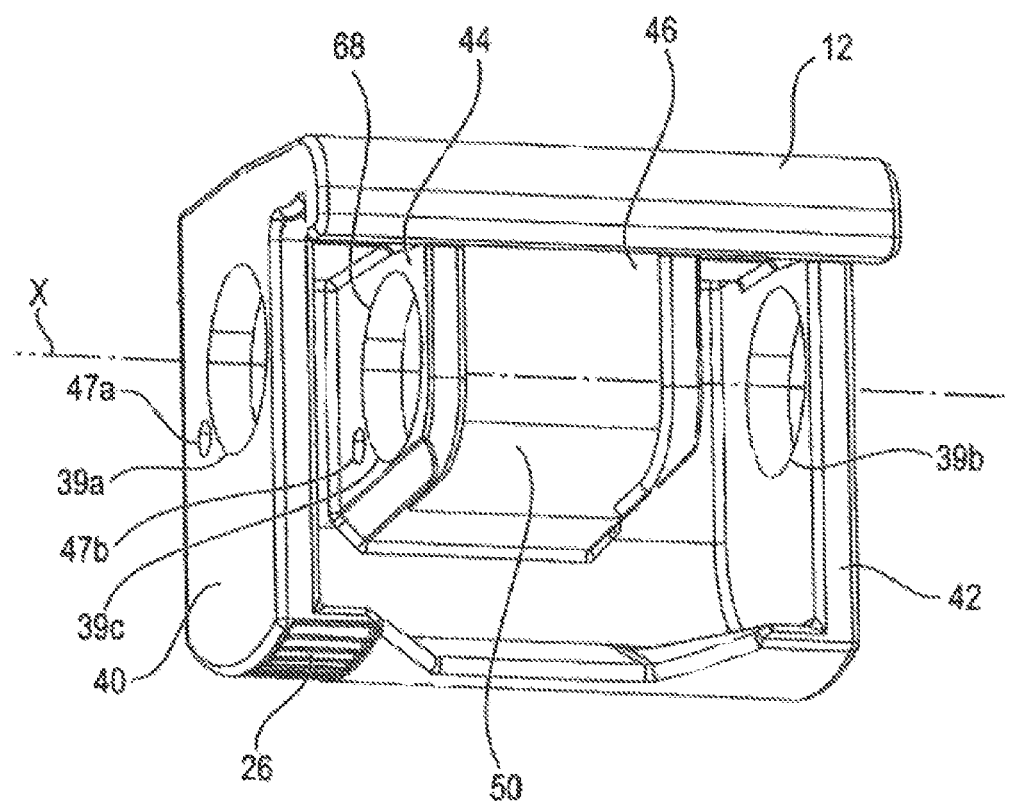
FIG. 8 is a front perspective view of the base body and an exemplary connecting part of the clamp assembly.

FIG. 8 shows a perspective view of the connecting element 50 arranged on the base body 12, from which the additional elements of the clamp assembly 14 are removed for clarity purposes. The connecting element 50 is guided through the third opening 39c of the first support wall 44, and the fourth opening 39d of the support wall 46 and is mounted on the base body 12 in a rotatable manner about the rotational axis X.

Figure 9:
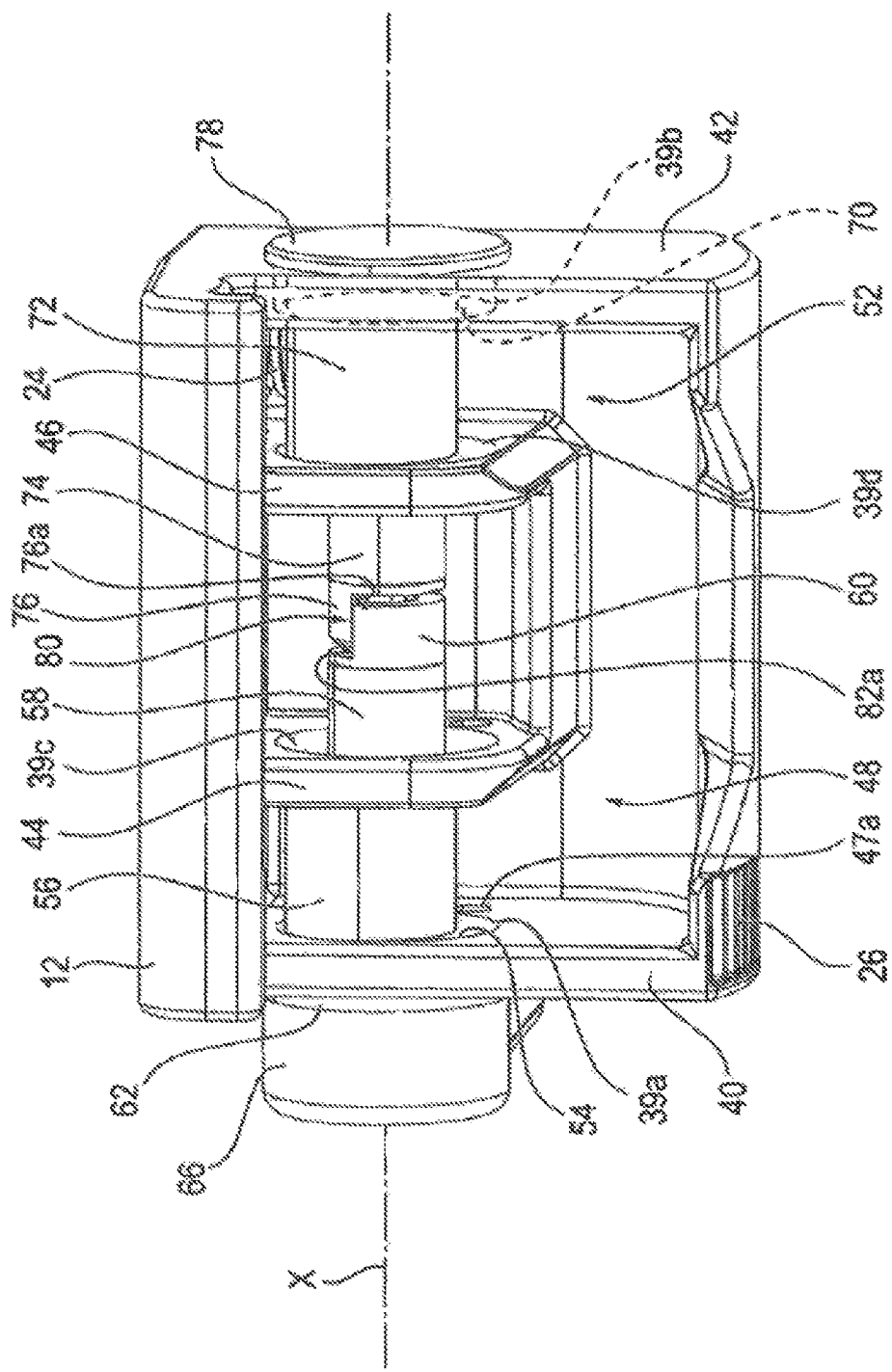
FIG. 9 is a front view of the base body and the clamp assembly.

FIG. 9 shows the base body 12, the first shaft element 48 (which is connected to pivot lever 22) and the second shaft element 52, in a front view. The first shaft element 48 is guided through the opening 39a in the first side wall 40 of the base body 12 and is mounted via the first shaft section 54 on the base body 12 in a rotatable manner about the rotational axis X. The stop disk 62, which is arranged coaxially to the first shaft section 54, rests, with an area that overlaps with the first shaft section 54, on an outer surface of the first side wall 40.

The eccentric 56 is arranged between the first side wall 40 and the first support wall 44. The second shaft section 58, which adjoins the eccentric 56, is guided through the third opening 39c and projects together with the shaft-connecting element 60 into the space between the support walls 44 and 46. The shaft-connecting element 60 and the area of the second shaft section 58 which projects into this intermediate space are accommodated in the through-hole 68 of the connecting element 50 (see FIG. 8).

The second shaft element 52 is further guided through the second opening 39b and is mounted via the first shaft section 70 on the base body 12 in a rotatable manner about the rotational axis X. The stop disk 78, which is arranged coaxially to the first shaft section 70, rests, with an area that overlaps the first shaft section 70, on an outer surface of the second side wall 42. The eccentric 72, which is arranged on the side of the first shaft section 70 opposite the stop disk 78, is fitted into the gap between the second side wall 42 and the second support wall 46. The second shaft section 74, which adjoins the eccentric 72, is guided through the fourth opening 39d and projects into the gap between the support walls 44 and 46. The shaft-connecting element 76 and the area of the second shaft section 74 that projects into this gap are accommodated in the connecting element 50.

Figure 11:
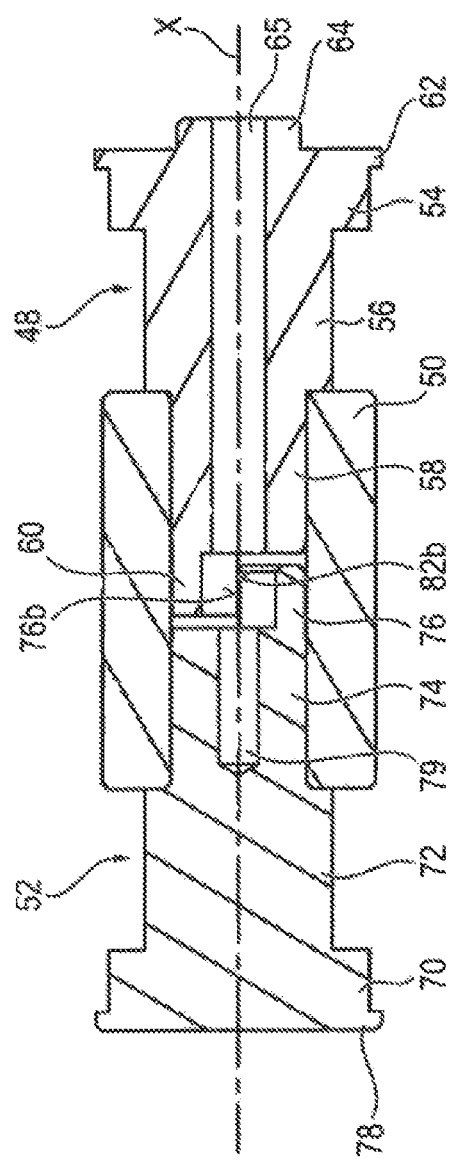
FIG. 11 is a cross-sectional view of the eccentric shaft of FIG. 10 taken through line A-A in FIG. 10.

The shaft-connecting element 76, which adjoins the second shaft section 74, has an area 80 that overlaps in the direction of the first rotational axis X with the shaft-connecting element 60, in which area the first support surface 76a rests on a first support surface 82a of the shaft-connecting element 60, and the second support surface 76b rests on a second support surface of the shaft-connecting element 60, designated in FIG. 11 as 82b, in such a way that the shaft elements 48 and 52 are connected rotationally about the rotational axis X.

Figure 10:
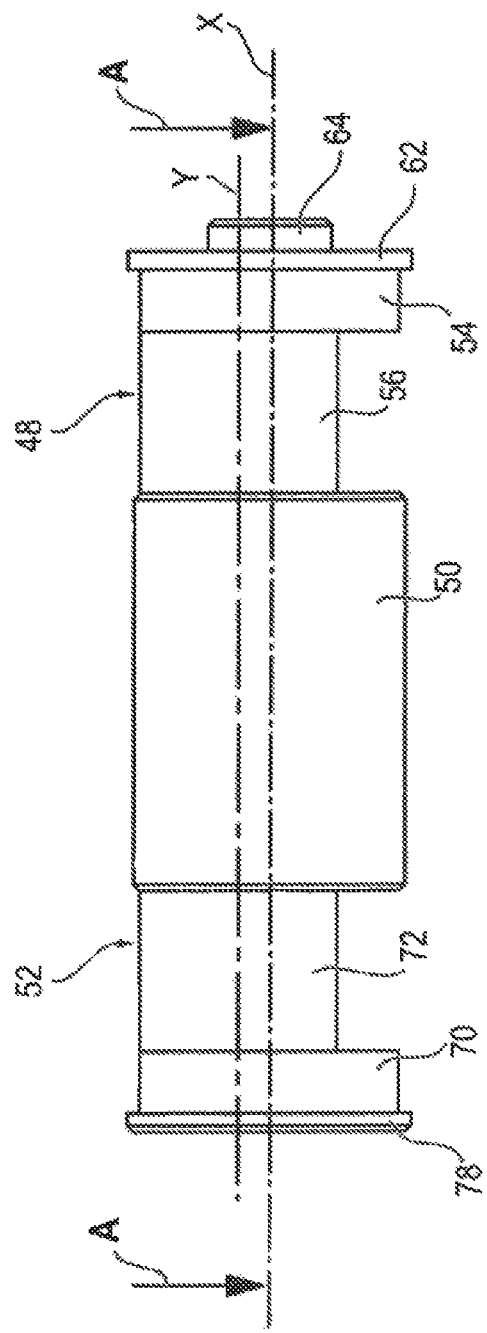
FIG. 10 is a side view of an exemplary eccentric shaft of the clamp assembly of FIG. 4.

FIG. 10 shows a side view of the eccentric shaft 20 in the locked state of the clamp assembly 14. The eccentrics 48 and 52 have a common longitudinal axis Y, which is parallel to the rotational axis X, and which is arranged above the rotational axis X in the rotational position of the eccentric shaft 20 shown in FIG. 10. FIG. 11 shows a longitudinal cross-section of the eccentric shaft 20 shown in FIG. 10 taken through line A-A in FIG. 10. This view illustrates the support surfaces 76b and 82b, which abut one another, along with the through-bore 65 and the blind borehole 79. A screw (not shown), which is in threaded engagement with the internal thread of the blind borehole 79, is guided through the through-bore 65, thereby connecting the shaft elements 48 and 52 to one another. The threaded connection of the shaft elements 48 and 52 presses the eccentrics 56 and 72 at opposite ends of the connecting element 50 in such a way that the shaft elements 48 and 52 are non-positively connected to the connecting element 50.

Figure 12:
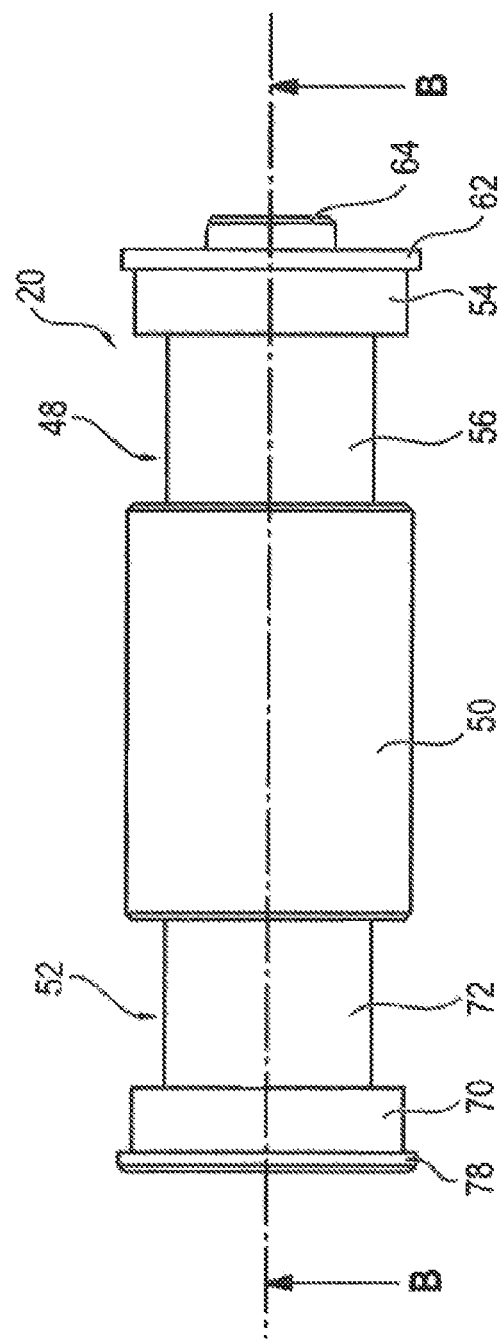
FIG. 12 is an additional side view of the eccentric shaft of FIG. 10.
Figure 13:
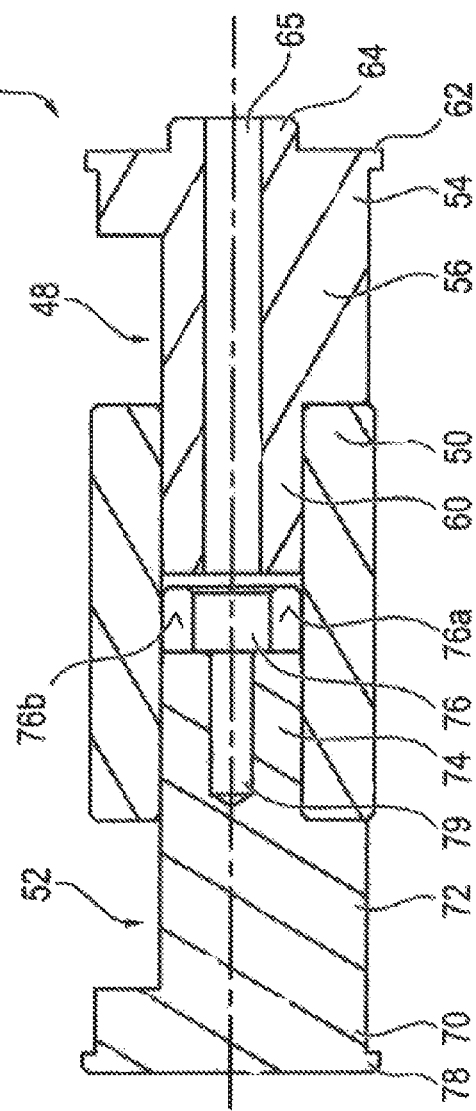
FIG. 13 is a cross-sectional view of the eccentric shaft of FIG. 10 taken through line B-B in FIG. 12.

FIG. 12 shows another side view of the eccentric shaft 20, in which the eccentric shaft has been rotated into a different position in which the support surfaces 76a and 76b are aligned horizontally. In this position, the longitudinal axis Y lies behind the rotational axis X and the eccentrics 56 and 72 assume a central position. FIG. 13 shows a longitudinal cross-section of the eccentric shaft 20 shown in FIG. 12 taken through line B-B in FIG. 12. This view illustrates the support surfaces 82a and 82b, which are rotated about the rotational axis X in relation to the positioning in FIG. 11 and which are aligned horizontally in FIGS. 12 and 13.

Figure 14:
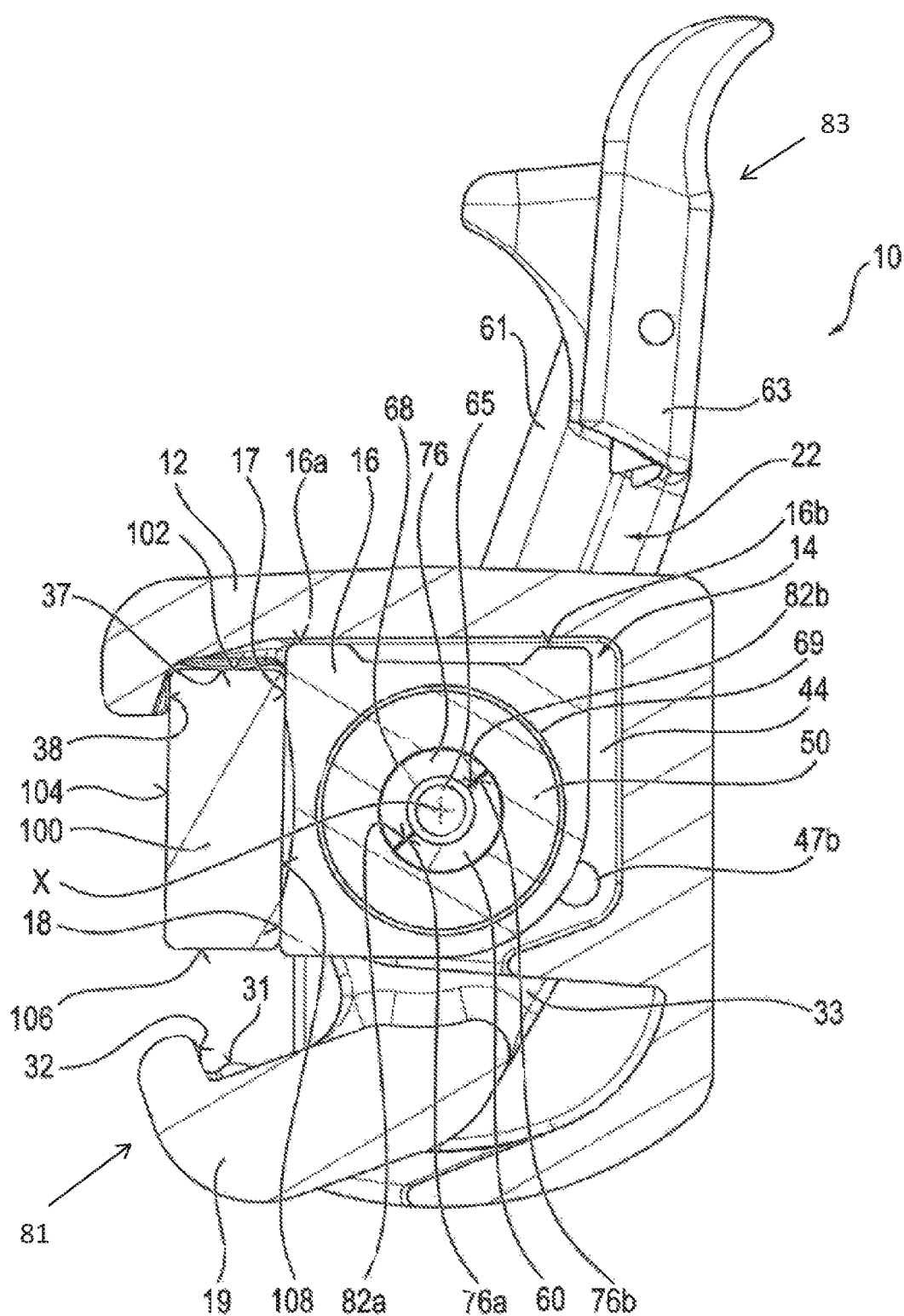
FIG. 14 is a cross-sectional view of the clamping claw of FIG. 2 mounted on the slide rail, with the clamp assembly in an open state and an exemplary activating member in an unlocked position.
Figure 15:
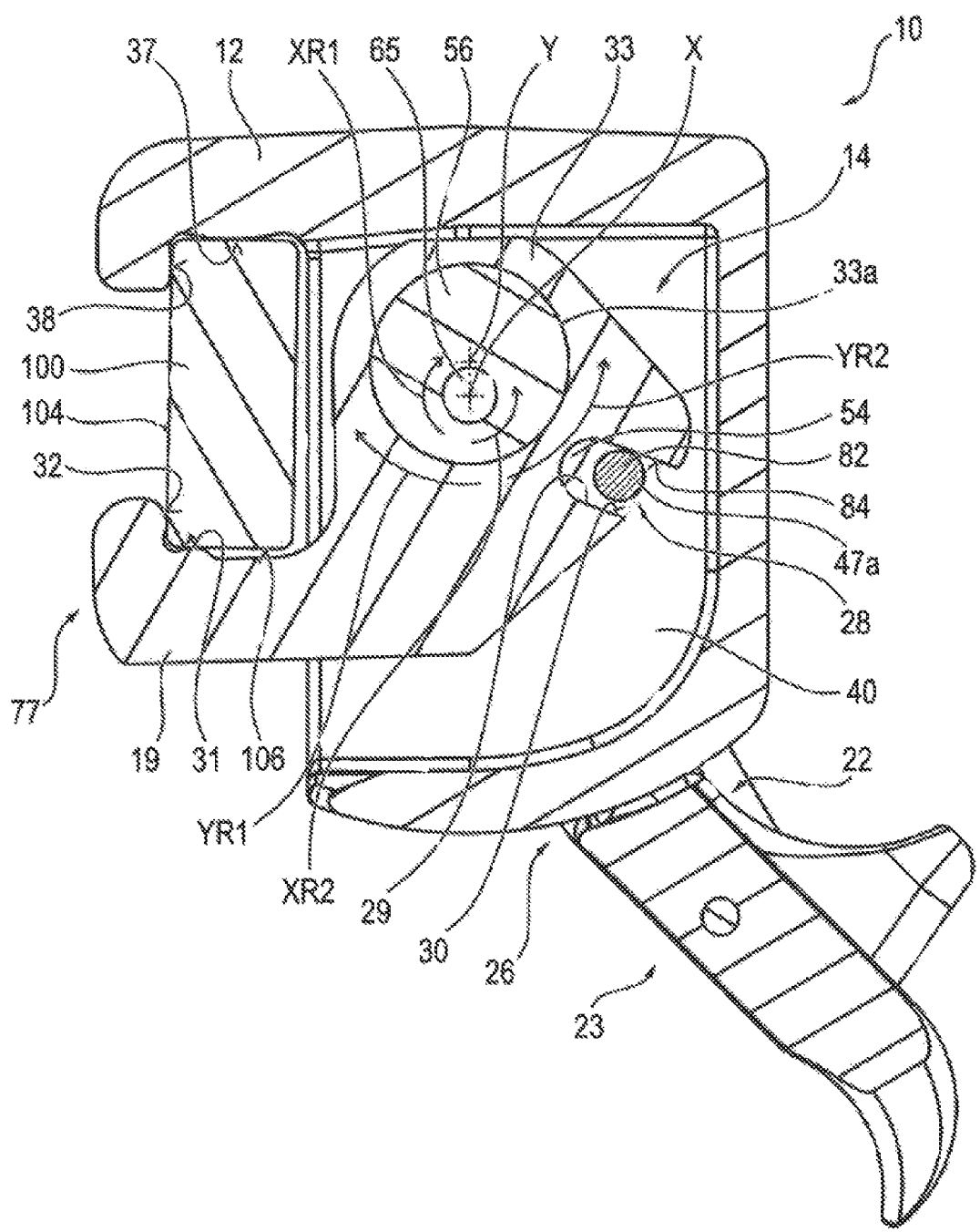
FIG. 15 is a cross-sectional view of the clamping claw of FIG. 2 mounted on the slide rail, with the clamp assembly in a locked state and the activating member in a locked position.
Figure 16:
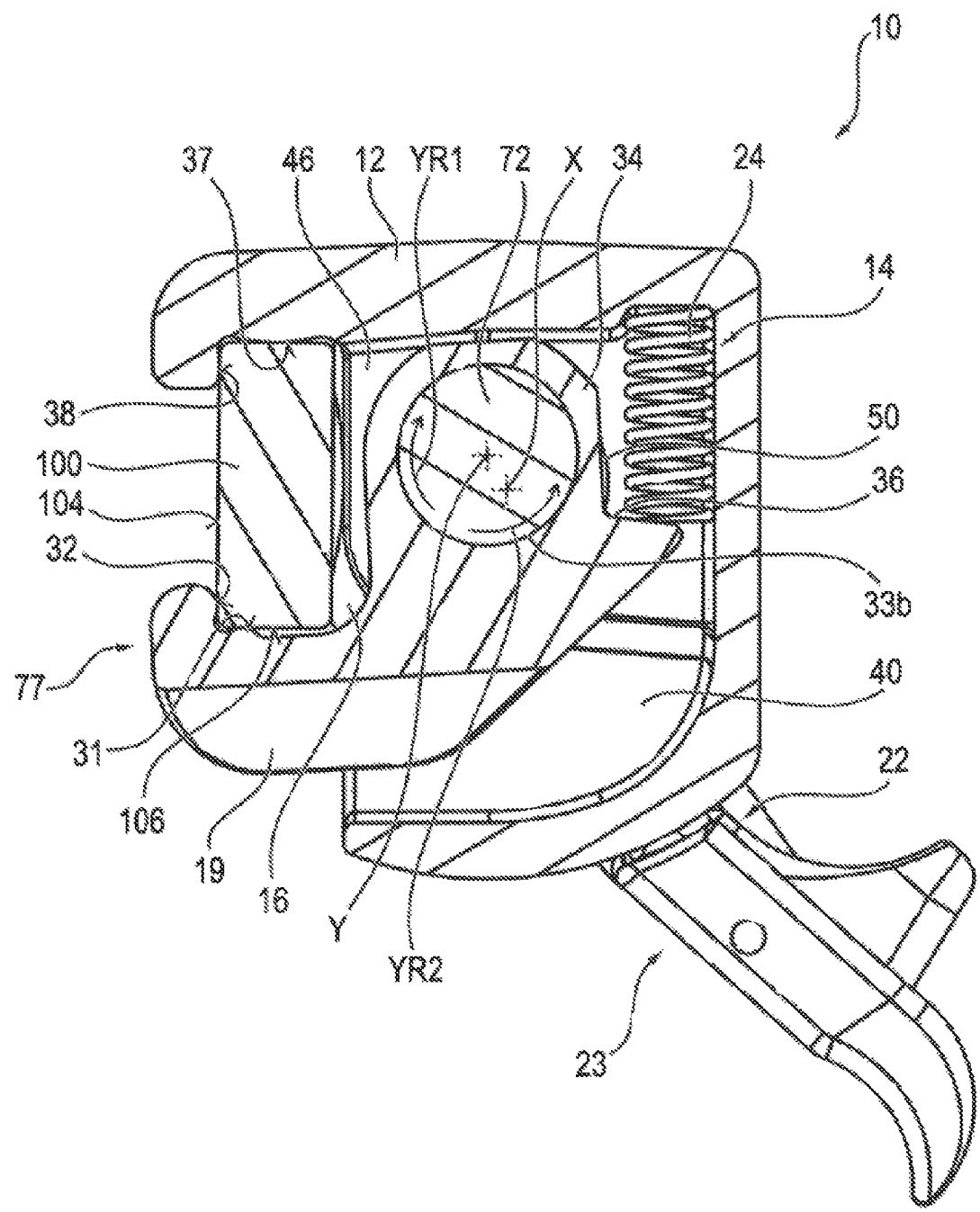
FIG. 16 is another cross-sectional view of the clamping claw of FIG. 2 mounted on the slide rail, with the clamp assembly in the locked state and the activating member in the locked position.

FIGS. 14, 15 and 16 each show a cross-section of the clamping claw 10 mounted on the slide rail 100, in which the cross-section of FIG. 14 is taken through the pressure piece 16, the cross-section of FIG. 15 is taken through the first arm 33 of the pivot lock 19, and the cross-section of FIG. 16 is taken through the second arm 34 of the pivot lock 19. The clamp assembly 14 of the clamping claw 10, which is shown mounted on the slide rail 100 in FIG. 14, is shown in an open state, in which the pivot lock 19 (i.e., the first support element of the clamp assembly 14) is in a starting position 81 and does not rest on the slide rail 100, and the activating member 22 (e.g., the pivot lever) is shown in an unlocked position. As shown, in various exemplary embodiments, when in the open state, the second support surface 38 of the base body 12 rests on the inner rail surface 104 of the slide rail 100, the first support surface 37 of the base body 12 rests on the upper rail surface 102, and the first support surface 17 and the second support surface 18 of the pressure piece 16 rest on the outer rail surface 108. In various additional exemplary embodiments, the pressure piece 16 can be inserted into the base body 12, rotated 90° about the rotational axis X relative to its position shown in FIG. 14, such that the contact surfaces 16a and 16b rest on the outer rail surface 108.

In FIGS. 15 and 16, the clamp assembly 14 is shown in a locked state and the activating member 22 is shown in a locked position. As is shown in FIGS. 15 and 16, the eccentric 56 is guided through the opening 33a of the first arm 33 of the pivot lock 19, and the eccentric 72 is guided through the opening 33b of the second arm 34 of the pivot lock 19. The pivot lock 19 is mounted on the eccentrics 56 and 72 in a pivotal manner about their common longitudinal axis Y. A pivoting movement of the pivot lock 19 about the longitudinal axis Y can take place in a first pivoting direction YR1 and in a second pivoting direction YR2, opposite the first pivoting direction YR1. In the shown pivoted position of the pivot lock 19, the first support surface 31 rests on the lower rail surface 106 and the second contact surface 32 rests on the inner rail surface 104 of the slide rail 100, so that in the locked state, the pivot lock 19 (i.e., the first support element of the clamp assembly 14) is in a support position 77.

To place the clamp assembly 14 into the locked state, in accordance with the present disclosure, the eccentrics 56 and 72 are each pivoted in a first direction of rotation XR1 about the rotational axis X by pivoting the activating member 22 (i.e., from its unlocked position 83 (see FIG. 14)) until the support surface 31 of the pivot lock 19 presses against the lower rail surface 106, and until the support surface 32 of the pivot lock 19 rests on the inner rail surface 104 of the slide rail 100. The mounting of the pivot lock 19 on the eccentrics 56 and 72 in a pivotal manner about the longitudinal axis Y gives the pivot lock a further degree of freedom, which is limited by the locking mechanism 28. As illustrated in the exemplary embodiment of FIG. 15, the groove 29 of the locking mechanism 28 has a second stop surface 84, with which the pin 82 is stopped such that the pivot lock 19 cannot be pivoted in the first pivoting direction YR1 about the longitudinal axis Y. In other words, the rotation of the pivot lock 19 about longitudinal axis Y in the first pivoting direction YR1 is prevented by the pin 82 striking the second stop surface 84 or by the support surface 31 resting on the slide rail 100.

The stop surfaces 30 and 84 are aligned parallel to one another and are spaced from one another by a distance that is greater than the diameter of the pin 82. In particular, the pin 82 either strikes the first stop surface 30, the second stop surface 84, or neither of the stop surfaces 30 or 84, but never strikes both of the stop surfaces 30 and 84 simultaneously. As a result, the pivot lock 19 has a clearance, within which a pivoting movement of the pivot lock 19 about the longitudinal axis Y and/or a movement of the pivot lock 19 together with the eccentrics 56 and 72 about the rotational axis X is provided by the locking mechanism 28.

As shown in the exemplary embodiment of FIG. 16, a helical compression spring 24 may exert a torque on the pivot lock 19, such that the stop surface 84 is pressed against the pin 82 and the pivot lock 19 is pressed against the slide rail 100. Various exemplary embodiments further contemplate that only the second stop surface 84 is pressed against the pin 82, or that only the pivot lock 19 is pressed against the slide rail 100, as will be explained later in reference to FIGS. 17 through 22.

Figure 17:
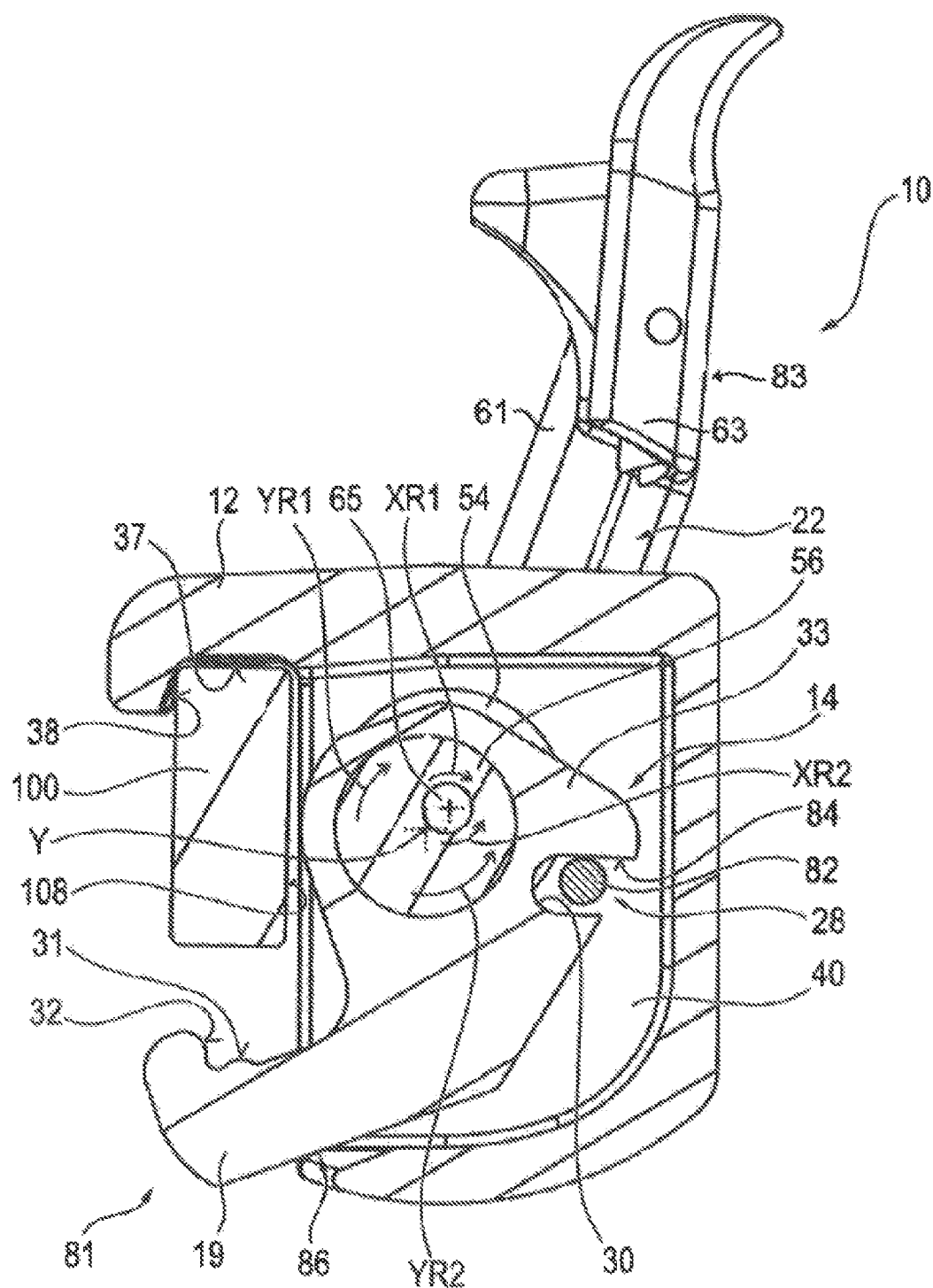
FIG. 17 is another cross-sectional view of the clamping claw of FIG. 2 mounted on the slide rail, with the clamp assembly in the open state and the activating member in the unlocked position.

FIG. 17 shows, for example, a cross-section of the clamping claw 10 mounted on the slide rail 100 through the first arm 33 of the pivot lock 19 with the clamp assembly 14 in the open state, the pivot lock 19 in a starting position 81, and the activating member 22 (i.e., pivot lever) in the unlocked position 83. To place the clamp assembly 14 into the open state, the activating member 22 is pivoted relative to the locked state, shown in FIG. 15, about the rotational axis X in a second direction of rotation XR2, which is opposite the first direction of rotation XR1, until the pivot lock 19 strikes an area 86 of the base body 12, and is therefore in the unlocked position 83. Thus, when the activating member 22 is pivoted from the locked position 23 (see FIG. 15) to the unlocked position 83, the pivot lock (i.e., the first support element) pivots from the support position 77 to the starting position 81 and the clamp assembly 14 moves from the locked state to the open state, and the longitudinal axis Y of the eccentric shafts 56 and 72 is moved along a circular arc about the rotational axis X in the second direction of rotation XR2. In this manner, when the clamp assembly 14 is in the open state, the longitudinal axis Y is positioned closer to the slide rail 100 than the rotational axis X, and lower than the rotational axis X in the orientation of FIG. 17, as opposed to the locked state of the clamp assembly 14 in which the longitudinal axis Y is positioned higher than the rotational axis X. When the activating member 22 is pivoted from the unlocked position 83 to the locked position 23, the pivot lock 19 is thereby moved away from the slide rail 100, so that the clamping claw 10 can be separated from the slide rail 100.

Furthermore, when the clamp assembly 14 is in the open state, the pin 82 strikes against the second stop surface 84, thereby preventing any further pivoting of the eccentrics 56 and 72 (i.e., together with the activating member 22) about the rotational axis X in the second direction of rotation XR2. A corresponding torque transmitted by the activating member 22 to the eccentrics 56 and 72 is transmitted via the pivot lock 19 to the pin 82 and to the main part 12 in the area 86; so that the pivot lock 19 and the activating member 22 will not move.

Figure 18:
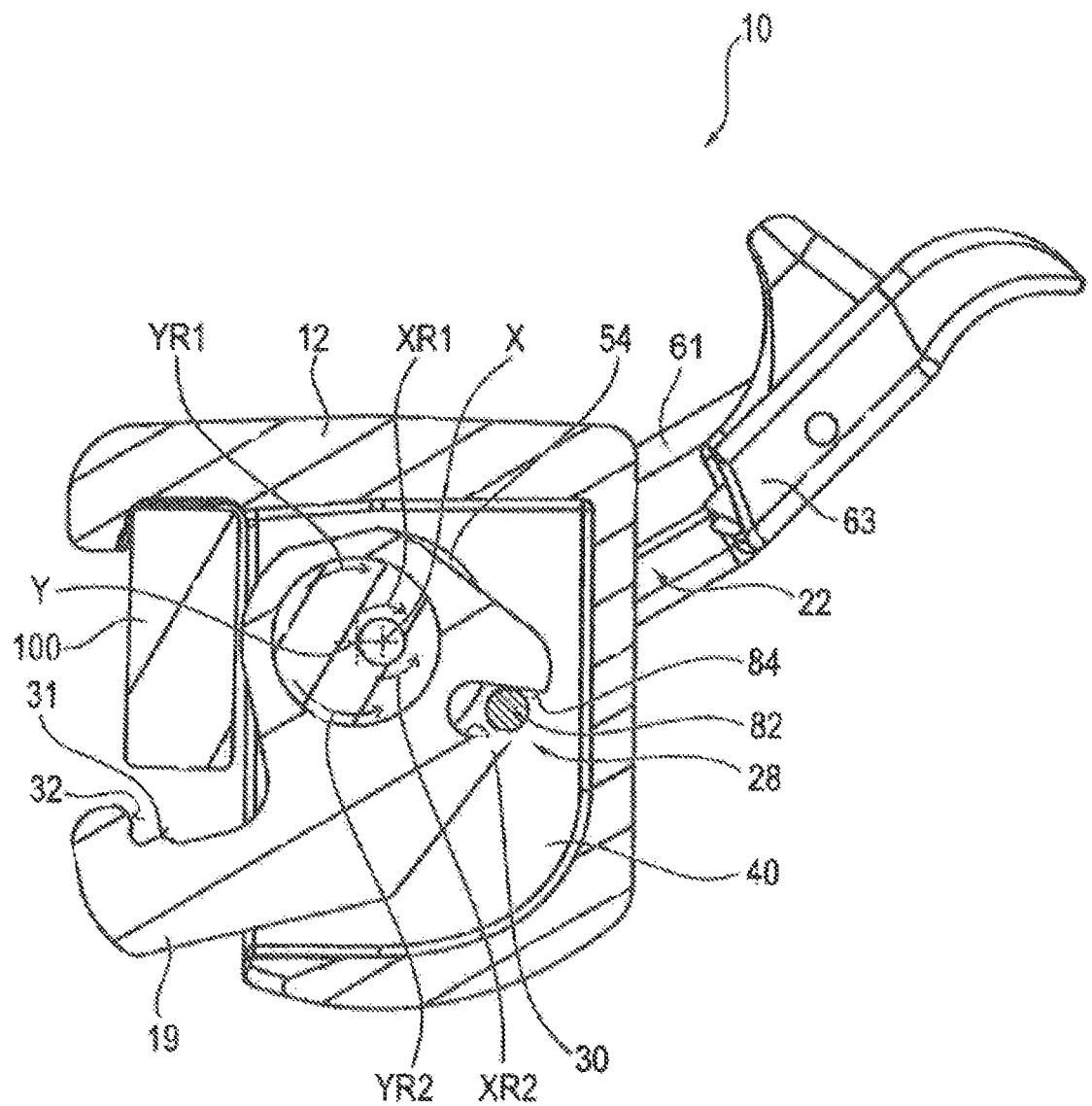
FIG. 18 is a cross-sectional view of the clamping claw of FIG. 2 mounted on the slide rail, with the clamp assembly in an intermediate state between the open and the locked states and the activating member in an intermediate position between the locked and unlocked positions.
Figure 19:
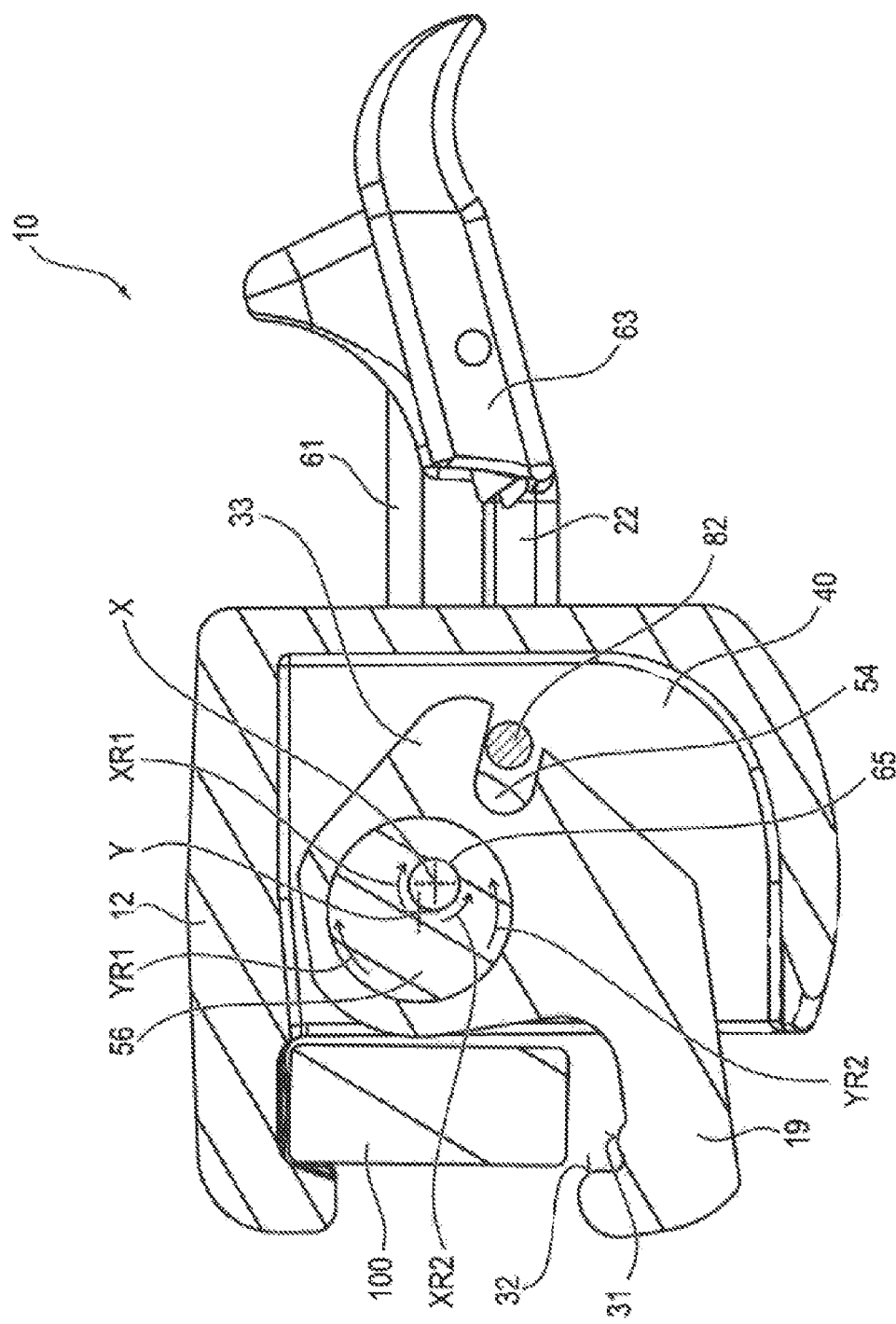
FIG. 19 is a cross-sectional view of the clamping claw of FIG. 2 mounted on the slide rail, with the clamp assembly in an additional intermediate state and the activating member in an additional intermediate position.
Figure 20:
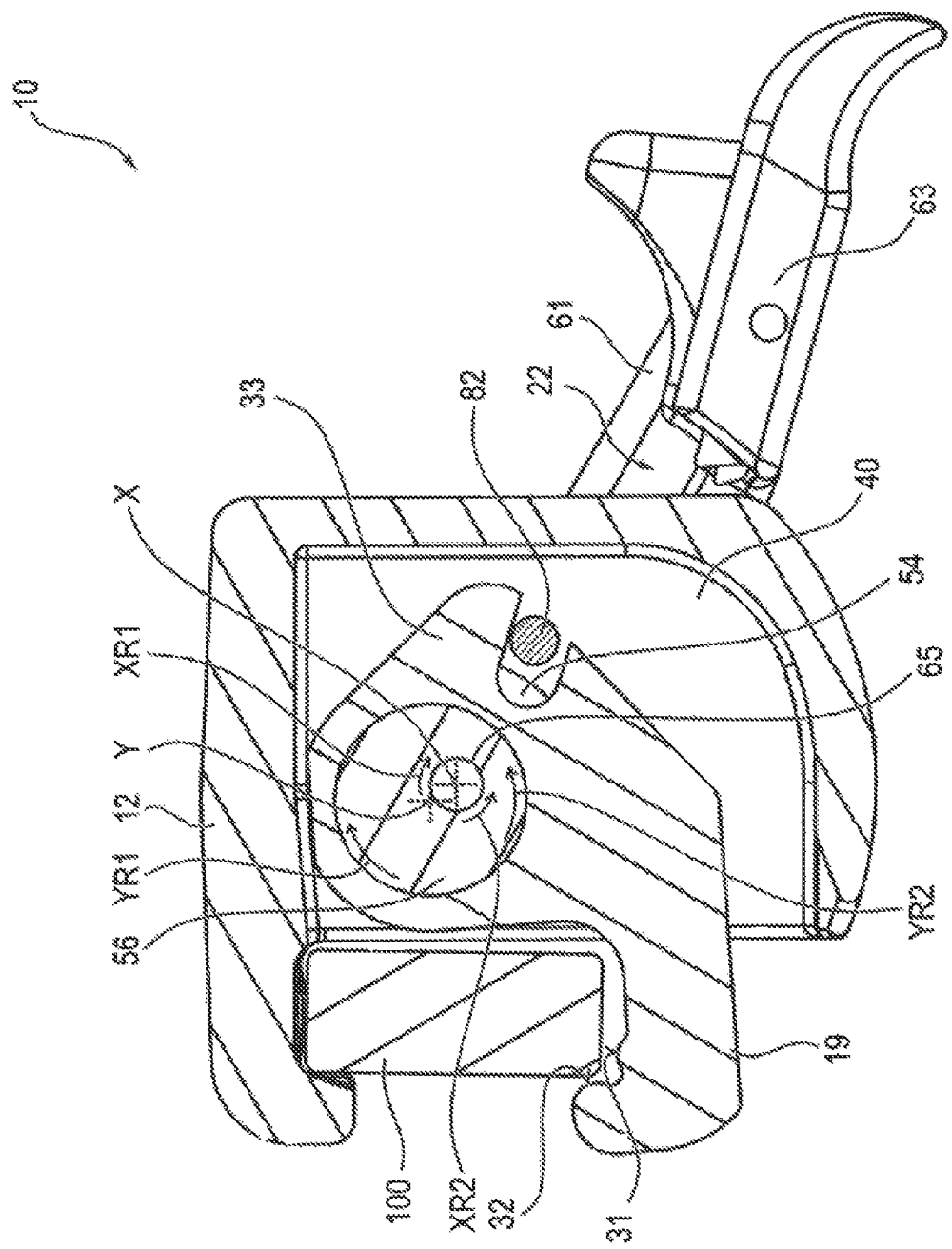
FIG. 20 is a cross-sectional view of the clamping claw of FIG. 2 mounted on the slide rail, with the clamp assembly in yet a further intermediate state and the activating member in a further intermediate position.

FIGS. 18 through 20 each show a cross-section of the clamping claw 10 taken through the first arm 33 of the pivot lock 19, with the activating member 22 in different intermediate positions, as the activating member transitions from the unlocked position 83 to the locked position 23. In FIG. 18, the activating member 22 is pivoted relative to the unlocked position 83 shown in FIG. 17 by a first angle about the rotational axis X in the first direction of rotation XR1, thereby pivoting the longitudinal axis Y of the eccentrics 56 and 72 by the first angle about the rotational axis X in the first direction of rotation XR1. The pivoting movement of the eccentrics 56 and 72 moves the support surfaces 31 and 32 of the pivot lock 19 in the direction of the slide rail 100. As the pivot lock 19 is moved, the second support surface 84 remains in contact with the pin 82 due to the pre-stressing of the helical compression spring 24. In the intermediate positions of the activating member 22 shown in FIGS. 19 and 20, the activating member 22 is pivoted, together with the eccentrics 56 and 72, in the first direction of rotation XR1 by a second and third angle, respectively, relative to the preceding figure in each case. With the pivoting of the eccentrics 56 and 72, the pivot lock 19 is pivoted, by the force of the helical compression spring 24, up to the slide rail 100 in such a way that the second stop surface 84 remains in contact with the pin 82 and the contact surfaces 31 and 32 of the pivot lock 19 are moved closer to the slide rail 100 in each case relative to the position shown in the preceding figure. With a further pivoting of the activating member 22 relative to its position shown in FIG. 20, the activating member 22 moves into the locked position 23 and the clamp assembly 14 is brought into the locked state, as shown in FIG. 15.

Figure 21:
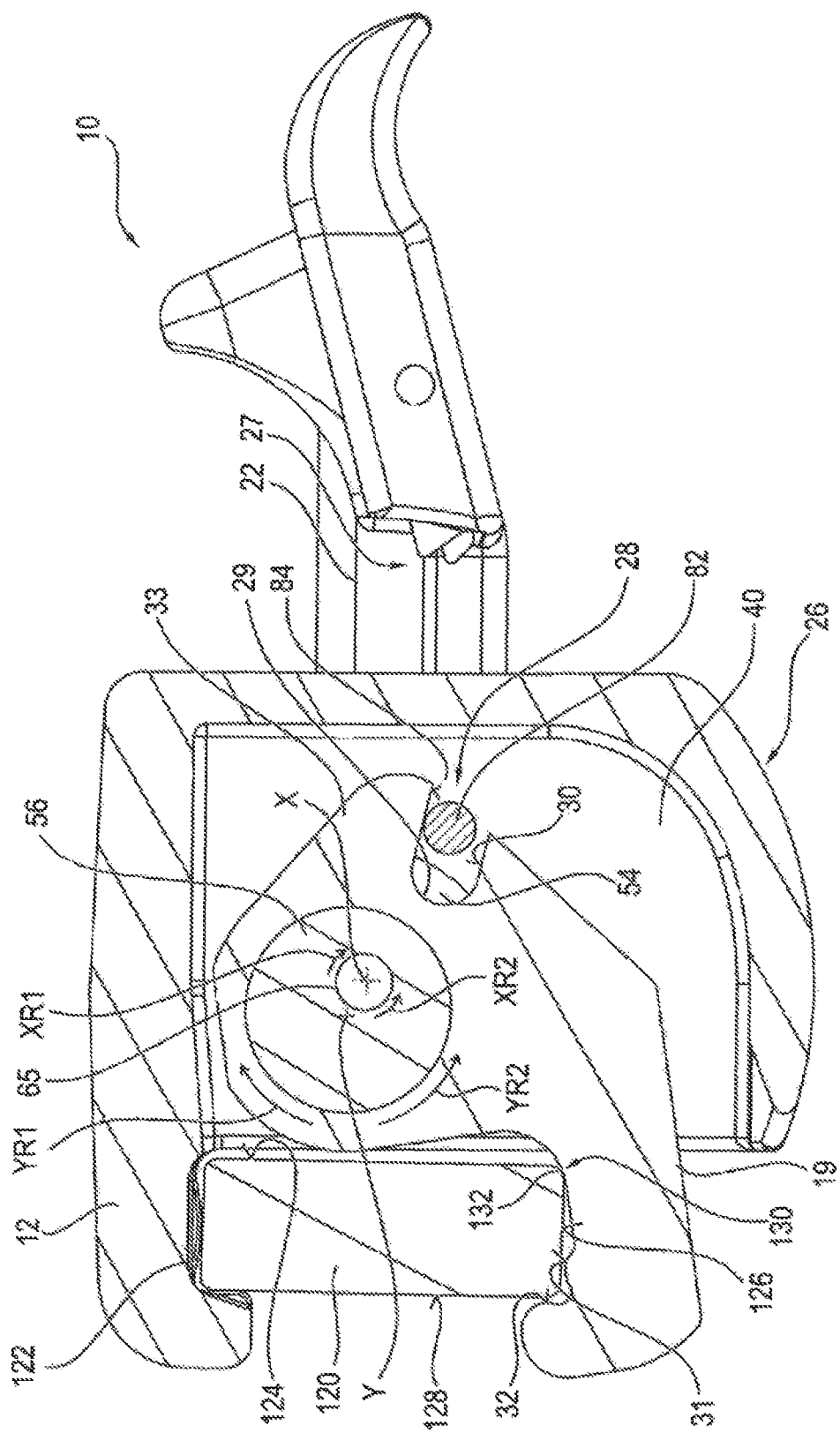
FIG. 21 is a cross-sectional view of the clamping claw of FIG. 2 mounted on a slide rail having a larger cross-section, with the clamp assembly in an intermediate state between the open and the locked states and the activating member in an intermediate position between the unlocked and locked positions.

The previous sequence, in which the clamp assembly 14 is moved from the open state to the locked state (and the activating member is moved from the unlocked position to the locked position), is dependent on the dimensions of the slide rail 100 and on the correct positioning of the base body 12 against the slide rail 100 when the clamping assembly 14 is in the open state. FIG. 21 shows a cross-section of the clamping claw 10 mounted on a rectangular slide rail 120, with the activating member 22 of the clamping claw 10 in the position shown in FIG. 19. The slide rail 120 has an upper rail surface 122, an inner rail surface 124, a lower rail surface 126, and an outer rail surface 128, the cross-sectional lengths of the inner rail surface 124 and the outer rail surface 128 each being greater than the cross-sectional lengths of the inner rail surface 104 of the outer rail surface 108 of the slide rail 100. Due to the greater dimensions of the slide rail 120, an area 130 of the pivot lock 19 abuts an edge 132 of the slide rail 120, without the support surfaces 31 and 32 of the pivot lock 19 resting on the slide rail 120. Since the pivot lock 19 abuts the slide rail 120, the pivot lock 19 cannot be moved any further by additional pivoting of the eccentrics 56 and 72, such that the support surfaces 31 and 32 each rest on the slide rail 120. Additional pivoting of the pivoting lever 22 in the first direction of rotation XR1 about the rotational axis X causes the eccentrics 56 and 72 to pivot further about the rotational axis X in the first direction of rotation XR1. The pivot lock 19 is pivoted relative to the eccentrics 56 and 72 in the second pivot direction YR2 about the longitudinal axis Y in such a way that the edge of the slide rail 120 stays in area 130 of the pivot lock 19. As the eccentrics 56 and 72 are pivoted, the pivot lock 19 substantially maintains its orientation relative to the base body 12, except for a slight pivoting, such that it is displaced substantially parallel by the pivoting of the eccentrics 56 and 72. In addition, the stop surfaces 30 and 84 of the groove 29 are moved together with the pivot lock 19 along the movement executed by the longitudinal axis Y, which is at least partially perpendicular to the stop surfaces 30 and 84. As the activating member 22 is pivoted further, the longitudinal axis Y is therefore moved such that the first stop surface 30 is moved toward the pin 82 and the second stop surface 84 is moved away from the pin 82.

Figure 22:
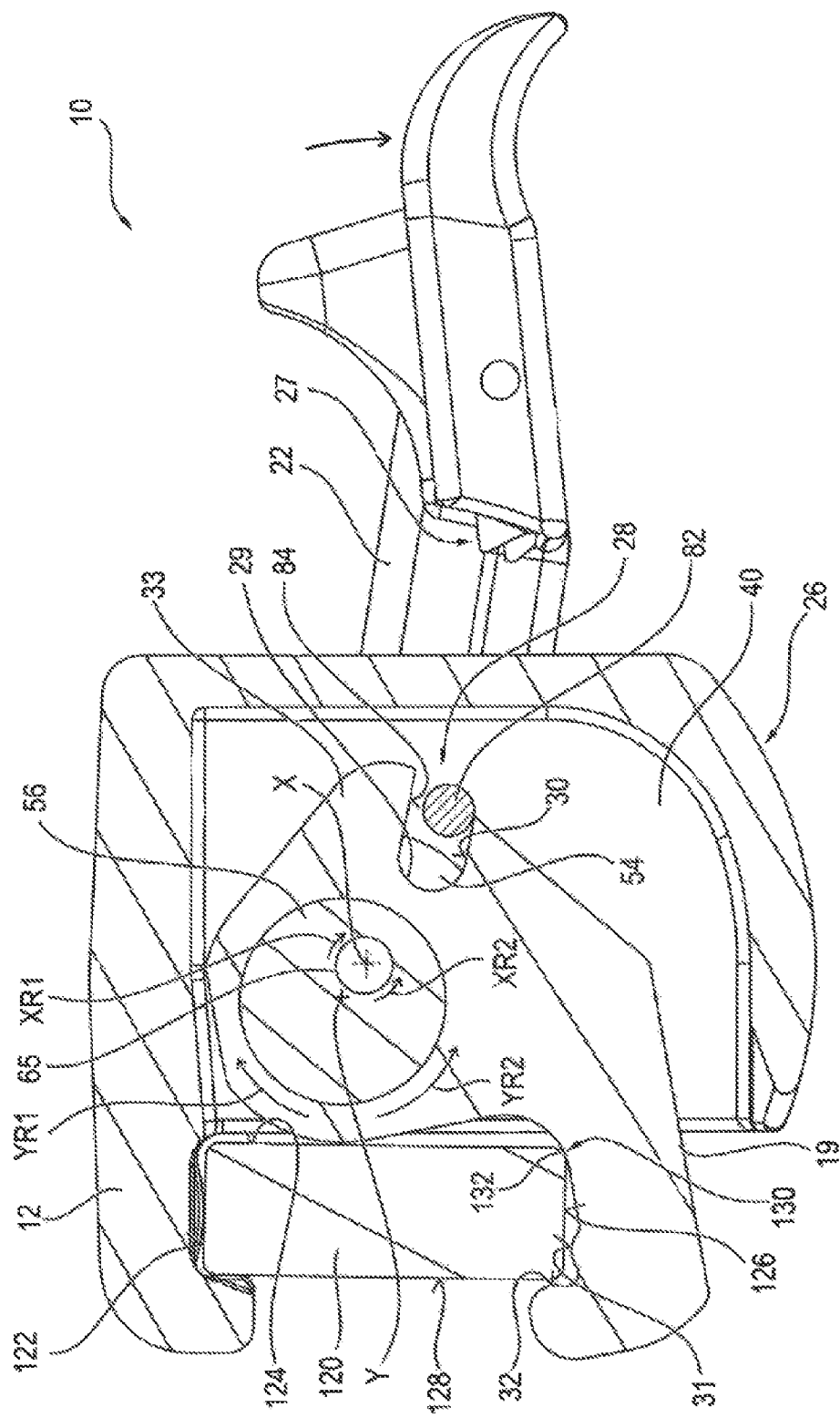
FIG. 22 is a cross-sectional view of the clamping claw of FIG. 2 mounted on the slide with the larger cross-section, with the clamp assembly in a state in which the activating member is blocked and stopped in the intermediate position.

FIG. 22 shows a cross-section of the clamping claw 10 mounted on the slide rail 120 after additional pivoting of the actuating lever 22 relative to the position occupied by the activating member 22 in FIG. 21. During the pivoting of the activating member 22, the pivot lock 19 was moved together with the eccentrics 56 and 72 along the movement executed by the longitudinal axis Y until the stop surface 30 strikes the pin 82. The pin 82, which is fixedly connected to the base body 12, prevents any additional pivoting movement of the eccentrics 56 and 72 about the rotational axis X in the first direction of rotation XR1 by means of the abutment of the stop surface 30, such that the activating member 22, which is rotationally fixed to the eccentrics 56 and 72, cannot be pivoted any further about the rotational axis X in the first direction of rotation XR1 and is stopped in an intermediate position. As a result, the pawls of the locking device 27 cannot be brought into engagement with the splined toothing 26, which signals to a user actuating the activating member 22 that the clamp assembly 14 is not in the locked state (i.e., that the pivot lock 19 is not in the support position 77) and the clamping claw 10 is not attached securely to the guide rail 120.

In other words, the locking mechanism 28 (formed by the stop surface 30 and the pin 82) can prevent the pivoting movement of the activating member 22 (i.e., the pivoting lever), and stop the activating member 22 in an intermediate position (i.e., between the unlocked position 83 and the locked position 23), if the pivot lock 19 (i.e., the first support element of the clamp assembly 14) is in an intermediate position between the starting position 81 and the support position 77.

While the present teachings have been disclosed in terms of exemplary embodiments in order to facilitate a better understanding, it should be appreciated that the present teachings can be embodied in various ways without departing from the scope thereof. Therefore, the present disclosure should be understood to include all possible embodiments which can be embodied without departing from the scope of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the clamping claw of the present disclosure without departing from the scope of its teachings. Other embodiments of the disclosure will be apparent to those skilled in the art from consideration of the specification and practice of the teachings disclosed herein. It is intended that the specification and embodiments described herein be considered as exemplary only.

I claim:

1. A clamping claw for attaching to a slide rail of an operating table, comprising:
    a base body having a support surface configured to rest on the slide rail;
    a clamp assembly disposed on the base body, the clamp assembly comprising a shaft mounted rotatably about a first rotational axis and a first support element pivotably mounted about a second rotational axis that is parallel to the first rotational axis;
    an activating member connected to the clamp assembly and configured to place the clamp assembly into a locked state in which the support surface of the base body and the first support element of the clamp assembly both rest on the slide rail, wherein the first support element is pivotably moveable between a starting position and a support position via a pivoting movement of the activating member, and wherein, when the first support element is in the support position, the clamp assembly is in the locked state; and
    a locking mechanism configured to prevent a pivoting movement of the activating member if the first support element is in an intermediate position between the starting position and the support position.

2. The clamping claw of claim 1, wherein the first support element comprises first and second support surfaces, wherein, when the clamp assembly is in the locked state, the first support surface is positioned to rest on a first rail surface of the slide rail, which faces the operating table, and the second support surface is positioned to rest on a second rail surface of the slide rail.

3. The clamping claw of claim 1, wherein the clamp assembly further comprises a second support element pivotably mounted on the shaft, the second support element having at least one support surface positioned to rest on the slide rail when the clamp assembly is in the locked state, wherein the at least one support surface of the second support element is disposed on a first side of the second support element, the first side being configured to rest on the slide rail, and
wherein the at least one support surface comprises a first contact surface and a second contact surface opposite the first contact surface.

4. The clamping claw of claim 3, wherein the second support element comprises a second side having third and fourth contact surfaces, and wherein the second support element is removable from the base body such that the second support element can be reinserted into the base body such that, when the clamp assembly is in the locked state, the third and fourth contact surfaces are positioned to rest on the slide rail.

5. A clamping claw for attaching to a slide rail of an operating table, comprising:
a base body comprising at least one support surface configured to rest on the slide rail;
a clamp assembly disposed on the base body and comprising:
a shaft mounted rotatably about a first rotational axis, the shaft including an eccentric that is pivotable about the first rotational axis, and
a first support element pivotably mounted about a second rotational axis that is stationary relative to the eccentric and is parallel to the first rotational axis;
an activating member rotationally fixed to the shaft of the clamp assembly and being pivotably moveable between an unlocked position and a locked position; and
a locking mechanism configured to stop the activating member in an intermediate position between the unlocked position and the locked position,
wherein, when the activating member is in the locked position, the clamp assembly is in a locked state and the support surface of the base body and the first support element of the clamp assembly are positioned to rest on the slide rail, and
the first support element is pivotably moveable between a starting position and a support position via a pivoting movement of the activating member, and when in the support position, the first support element is positioned to rest on the slide rail such that the clamp assembly is in the locked state.

6. The clamping claw of claim 5, wherein the first support element comprises first and second support surfaces and, when the clamp assembly is in the locked state, the first support surface is positioned to rest on a first rail surface of the slide rail, which faces the operating table, and the second support surface is positioned to rest on a second rail surface of the slide rail.

7. The clamping claw of claim 5, wherein the eccentric has a cylindrical shape and a longitudinal axis of the eccentric is the second rotational axis.

8. The clamping claw of claim 5, wherein the locking mechanism includes a stop and a stop surface and, when the first support element is in an intermediate position, the stop is configured to strike the stop surface to block a pivoting movement of the eccentric caused by the pivoting movement of the activating member.

9. The clamping claw of claim 8, wherein the stop surface is formed in the first support element and the stop is fixedly connected to the base body.

10. The clamping claw of claim 8, wherein the stop is a pin and the stop surface is a first surface of a groove formed in the first support element.

11. The clamping claw of claim 10, wherein the first surface of the groove and the pin are aligned parallel to the second rotational axis.

12. The clamping claw of claim 10, wherein a width of the groove is greater than a diameter of the pin.

13. The clamping claw of claim 10, wherein the clamp assembly further comprises a second support element pivotably mounted on the shaft about the first rotational axis, the second support element having at least one support surface positionable to rest on the slide rail in the locked state of the clamp assembly.

14. The clamping claw of claim 13, wherein the eccentric comprises first and second eccentric portions,
wherein the first support element has first and second arms, the first arm being mounted on the first eccentric portion and the second arm being mounted on the second eccentric portion, each of the first and second arms being mounted in a rotatable manner about the second rotational axis, and
wherein the second support element is disposed between the first and second arms of the first support element.

15. The clamping claw of claim 14, wherein the shaft comprises a first shaft element, a second shaft element, and a connecting element,
wherein the first eccentric portion is formed on the first shaft element and the second eccentric portion is formed on the second shaft element, and the connecting element has a through-hole into which each of the first and second shaft elements project, such that the first shaft element can be connected to the second shaft element and permit co-rotation about the first rotational axis, and
wherein the connecting element is rotatably mounted on the base body about the first rotational axis and the second support element is pivotably mounted on the connecting about the first rotational axis.

16. The clamping claw of claim 14, wherein the first arm and/or the second arm has a projection, and the clamping claw further comprises a spring disposed between the projection and the base body, the spring being configured to press a second surface of the groove, which is opposite the first surface of the groove, against the pin.

17. The clamping claw of claim 5, wherein the activating member is a pivot lever having a ratchet shoe with at least one rachet pawl, which in the locked state engages in a releasable manner with a toothing disposed on the base body.

18. An operating table system, comprising:
an operating table clamp having a base body;
an operating table having a rail;
a clamp assembly disposed on the base body, the clamp assembly comprising a shaft that is mounted rotatably about a first rotational axis and a pivot lock pivotably mounted about a second rotational axis that is parallel to the first rotational axis;
a pivot lever that is connected to the clamp assembly, the clamp assembly being brought by the pivot lever into a locked state in which the support surface of the base body and the pivot lock of the clamp assembly both rest on the slide rail, wherein, with a pivoting movement of the pivot lever, the pivot lock is pivotably moveable between a starting position and a support position, wherein, in the support position, the clamp assembly is in the locked state; and a locking mechanism configured to prevent a pivoting movement of the pivot lever if the pivot lock is in an intermediate position between the starting position and the support position.

19. The operating table system of claim 18, wherein the locking mechanism includes a stop and a stop surface, and wherein, when the pivot lock is in the intermediate position, the stop is configured to strike the stop surface such that the pivoting movement of the pivot lever is blocked.

20. The operating table system of claim 19, wherein the stop is a pin fixedly connected to the base body and the stop surface is a groove surface formed in the pivot lock.

* * * * *